United States Patent
Taguchi

(10) Patent No.: US 7,951,434 B2
(45) Date of Patent: May 31, 2011

(54) POLARIZING PLATE AND LIQUID CRYSTAL DISPLAY DEVICE

(75) Inventor: Keiichi Taguchi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 992 days.

(21) Appl. No.: 11/630,481

(22) PCT Filed: Jun. 22, 2005

(86) PCT No.: PCT/JP2005/011867
§ 371 (c)(1),
(2), (4) Date: Dec. 22, 2006

(87) PCT Pub. No.: WO2005/124406
PCT Pub. Date: Dec. 29, 2005

(65) Prior Publication Data
US 2009/0103013 A1 Apr. 23, 2009

(30) Foreign Application Priority Data
Jun. 22, 2004 (JP) .................................. 2004-183829

(51) Int. Cl.
*G02F 1/1335* (2006.01)

(52) U.S. Cl. ........... 428/1.31; 349/96; 349/97; 359/490; 359/491

(58) Field of Classification Search ................. 428/1.31; 349/96–97, 117–118; 359/511, 490–491
See application file for complete search history.

(56) References Cited

U.S. PATENT DOCUMENTS

| | | | |
|---|---|---|---|
| 5,568,290 A | 10/1996 | Nakamura | |
| 5,793,455 A | 8/1998 | Nakamura | |
| 6,542,300 B2 * | 4/2003 | Umemoto | ..................... 359/491 |
| 6,559,912 B2 * | 5/2003 | Aminaka | ........................ 349/96 |
| 6,683,717 B1 * | 1/2004 | Miyatake et al. | ............. 359/490 |
| 6,706,339 B1 * | 3/2004 | Miyatake et al. | ............. 428/1.31 |
| 6,881,457 B2 * | 4/2005 | Tasaka et al. | .................. 428/1.3 |
| 2001/0005748 A1 * | 6/2001 | Kayane et al. | ................. 534/807 |
| 2002/0015807 A1 * | 2/2002 | Sugino et al. | ................. 428/1.31 |
| 2003/0053011 A1 * | 3/2003 | Mori | ................................ 349/96 |
| 2004/0024198 A1 * | 2/2004 | Shibata et al. | .................. 536/69 |
| 2004/0059106 A1 | 3/2004 | Yamada et al. | |
| 2004/0096594 A1 * | 5/2004 | Takeuchi et al. | ............... 428/1.2 |
| 2004/0114248 A1 * | 6/2004 | Hokazono et al. | ............ 359/603 |

FOREIGN PATENT DOCUMENTS

| | | |
|---|---|---|
| EP | 0 911 656 A2 | 4/1999 |
| JP | 62-156602 A | 7/1987 |
| JP | 2-247602 A | 10/1990 |
| JP | 05-100115 A | 4/1993 |
| JP | 06-347641 A | 12/1994 |
| JP | 7-191217 A | 7/1995 |
| JP | 08-050206 A | 2/1996 |
| JP | 8-304624 A | 11/1996 |
| JP | 2000-154261 A | 6/2000 |
| JP | 2001-91736 A | 4/2001 |
| JP | 2002-71957 A | 3/2002 |
| JP | 2002-86554 A | 3/2002 |
| JP | 2002-212338 A | 7/2002 |
| JP | 2003-294909 A | 10/2003 |
| JP | 2003-294943 A | 10/2003 |
| JP | 2003-315538 A | 11/2003 |
| JP | 2004-050516 A | 2/2004 |
| JP | 2004-233871 A | 8/2004 |
| WO | WO 00/55657 A1 | 9/2000 |
| WO | 02/084338 A2 | 10/2002 |
| WO | WO 02/101447 A1 | 12/2002 |
| WO | WO 2004/038477 A1 | 5/2004 |
| WO | WO 2004/050751 A1 | 6/2004 |

OTHER PUBLICATIONS

Taguchi, U.S. Appl. No. 11/630,491, "*Polarizing Plate and Liquid Crystal Display Device*", Dec. 22, 2006.
International Search Report for PCT/JP2005/011867, dated Sep. 9, 2005.
Japanese Office Action (Notification of Reasons for Refusal) issued Jun. 29, 2010 in corresponding Japanese Patent Application No. 2005-169656, and English translation thereof.
Office Action issued Nov. 24, 2010, in corresponding Japanese Patent Application No. 2005-169656, and translation thereof.

* cited by examiner

*Primary Examiner* — Sophie Hon
(74) *Attorney, Agent, or Firm* — Buchanan Ingersoll & Rooney PC

(57) ABSTRACT

A polarizing plate is provided and is excellent in characteristics of optical compensation, small in a change of polarization performance over time and excellent in moisture and heat resistance. The polarizing plate contains a polarizing film and two transparent protective films provided one on each side of the polarizing film, in which at least one of the two protective films is an optical compensatory sheet containing a cellulose acylate film. The polarizing plate has specified single-plate transmittance and polarization degree P and has specified ranges of variations of the transmittance and the polarization degree P after a passage of a specified period of time under a high-temperature high-humidity atmosphere and a high-temperature low-humidity atmosphere. The liquid crystal display device of VA mode using the polarizing plate is provided.

20 Claims, No Drawings

POLARIZING PLATE AND LIQUID CRYSTAL DISPLAY DEVICE

This application is a 371 of PCT/JP05/11867 filed Jun. 22, 2005.

TECHNICAL FIELD

The invention relates to a polarizing plate using an optical compensatory sheet having a cellulose acylate film and a liquid crystal display device using the polarizing plate.

BACKGROUND ART

A polarizing plate is ordinarily produced by sticking a film having, as a main component, cellulose triacetate as a transparent protective film on each side of a polarizing film in which iodine or a dichroic dye is allowed to be absorbed in vinyl alcohol in an alignment manner. Cellulose triacetate which has such characteristics as a high toughness, a high fire retardancy and a high optical isotropy (low retardation value) has widely been used as a transparent protective film for the polarizing plate.

A liquid crystal display device has a polarizing plate and a liquid crystal cell. At present, in a TFT liquid crystal display device of TN mode which is a main stream of the liquid crystal display device, as described in JP-A-8-50206, by interposing a optical compensatory sheet (retarder film) between the polarizing plate and the liquid crystal cell, the liquid crystal display device having a high display quality has been realized. However, in such method as described above, there is a problem in that the liquid crystal display device itself becomes thick and the like.

Against this method, JP patent application number 1-68940(published as JP-A-2-247602) discloses that a front face contrast can be enhanced by using an ellipsoidal polarizing plate in which one face of a polarizing film has an optical compensatory sheet and the other face of the polarizing film has a protective film, without increasing thickness of the liquid crystal display device. However, the optical compensatory sheet according to JP-A-2-247602 is likely to generate a phase difference derived from a strain caused by heat or the like and, accordingly, it is found that there is a problem in that a leakage of light occurs.

Against the problem of the phase difference derived from the strain, in JP-A-7-191217 and EP 0 911 656, techniques in each of which an optical compensatory sheet produced by applying an optical anisotropic layer having a discotic compound on a transparent support is used as it is as a protective film of the polarizing plate are described. It is described therein that the problem can be improved by these techniques without increasing the thickness of the liquid crystal display device.

However, even by these techniques, it has not been sufficient to allow hue to be neutral gray.

In the liquid crystal display device using the polarizing plate in which the optical compensatory sheet and the polarizing film are unified, although a viewing angle is wide, an improvement of the hue is not sufficient and, accordingly, there is a problem in that a leakage of light is generated.

DISCLOSURE OF THE INVENTION

An object of an illustrative, non-limiting embodiment of the invention is to provide a polarizing plate excellent in characteristics of optical compensation and having a favorable hue.

Another object of an illustrative, non-limiting embodiment of the invention is to provide a liquid crystal display device of VA mode having a wide viewing angle and having a favorable hue.

The present inventors have exerted an intensive study and, as a result, found that there is a correlation among a polarization degree of a polarizing plate to be used in a liquid crystal display device, transmittance at 700 nm and transmittance at 410 nm each at the time of a cross nicol configuration and the above-described objects can be achieved, to thereby accomplish the invention.

1. A polarizing plate comprising:
    a polarizing film; and
    two transparent protective films, wherein the polarizing film is between the two transparent protective films, and at least one of the transparent protective films is an optical compensation sheet comprising a cellulose acylate film,
    wherein
    the polarizing plate has a polarization degree P calculated by formula (1) of 99.9% or more, and
    when two polarizing plates are arranged in a cross nicol configuration, the two polarizing plates has a transmittance at 700 nm of 0.07% or less and a transmittance at 410 nm of 0.05% or less:

$$\text{Polarization degree } P=((H0-H1)/(H0+H1))^{1/2} \times 100 \quad (1)$$

wherein H0 represents a transmittance of two polarizing plates at the time the two polarizing plates are stacked on each other such that absorption axes of the two polarizing plates correspond with each other; and H1 represents a transmittance of two polarizing plates at the time the two polarizing plates are stacked on each other such that absorption axes of the two polarizing plates are perpendicular to each other.

2. The polarizing plate according to clause 1, wherein the transmittance at 410 nm of the two polarizing plates arranged in the cross nicol configuration is 0.02% or less.

3. The polarizing plate according to clause 1 or 2, wherein the optical compensation sheet has: Re retardation value defined by formula (2) of from 20 to 80 nm; Rth retardation value defined by formula (3) of from 70 to 400 nm; and a ratio of Re retardation value to Rth retardation value of from 0.1 to 0.5:

$$Re=(nx-ny) \times d \quad (2)$$

$$Rth=\{(nx+ny)/2-nz\} \times d \quad (3)$$

wherein nx represents an in-plane refractive index of the optical compensation sheet in a direction of slow axis; ny represents an in-plane refractive index of the optical compensation sheet in a direction of fast axis; nz represents a refractive index of the optical compensation sheet in a thickness direction; and d represents a thickness of the optical compensation sheet.

4. The polarizing plate according to clause 3, wherein the cellulose acylate film comprises a mixed aliphatic acid ester of cellulose, wherein a hydroxyl group of the cellulose is substituted by an acetyl group, and another hydroxyl group of the cellulose is substituted by an acyl group having 3 or more carbon atoms; and the cellulose acylate satisfies formulae (4) and (5):

$$2.0 \leq A+B \leq 3.0 \quad (4)$$

$$0<B \quad (5)$$

wherein A is a degree of substitution by the acetyl group; and B is a degree of substitution by the acyl group having 3 or more carbon atoms.

5. The polarizing plate according to clause 4, wherein the acyl group is a butyryl group.
6. The polarizing plate according to clause 4, wherein the acyl group is a propionyl group, and the degree B is 1.3 or more.
7. The polarizing plate according to any one of clause 4 to 6, wherein a sum of the degree of substitution of hydroxyl group in a 6-position of cellulose is 0.75 or more.
8. The polarizing plate according to any one of clauses 4 to 7, wherein DS2, DS3 and DS6 respectively representing degrees of substitution of hydroxyl groups in 2, 3 and 6 positions of a glucose unit of the cellulose by an acyl group having 2 or more carbon atoms satisfy:

$$2.0 \leq DS2+DS3+DS6 \leq 3.0 \quad (I)$$

$$DS6/(DS2+DS3+DS6) \geq 0.315 \quad (II)$$

9. The polarizing plate according to any one of clause 1 to 8, wherein the cellulose acylate film comprises a compound containing at least two aromatic rings in an amount of from 0.01 to 20 parts by weight based on 100 parts by weight of cellulose acylate.
10. The polarizing plate according to clause 9, wherein the compound containing at least two aromatic rings is a rod-shaped compound having a linear molecular structure.
11. The polarizing plate according to any one of clause 1 to 10, wherein the cellulose acylate film is a film stretched at a draw ratio of from 3 to 100%.
12. The polarizing plate according to clause 11, wherein the cellulose acylate film comprises a cellulose acetate having: an acetylation degree of from 59.0 to 61.5%; and an amount of Re/Rth change of from 0.01 to 0.1 per % of draw ratio.
13. The polarizing plate according to any one of clause 1 to 12, wherein the cellulose acylate film is a film stretched in a direction perpendicular to a longitudinal direction with a content of residual solvent in the cellulose acylate film, the content being kept to a range of from 2 to 30% by weight while the film being conveyed in the longitudinal direction; and the optical compensation sheet has a slow axis aligned in the direction perpendicular to the longitudinal direction thereof.
14. The polarizing plate according to any one of clause 1 to 13, wherein one of the two transparent protective films is the optical compensation sheet comprising the cellulose acylate film; the other of the two transparent protective films has an anti-reflection layer having a specular reflectance of 2.5% or less; and the anti-reflection layer comprises a light-scattering layer and a lower refractive layer.
15. The polarizing plate according to any one of clause 1 to 13, wherein one of the two transparent protective films is the optical compensation sheet comprising the cellulose acylate film; the other of the two transparent protective films has an anti-reflection layer having a specular reflectance of 0.5% or less; and the anti-reflection layer comprises a middle refractive layer, a higher refractive layer, and a lower refractive layer in this order.
16. The polarizing plate according to any one of clause 1 to 15, wherein the polarizing film comprises a dichroic substance and a hue adjusting agent.
17. The polarizing plate according to clause 16, wherein the hue adjusting agent has a main absorption in at least one range of from 380 nm to 500 nm and from 600 nm to 720 nm.
18. The polarizing plate according to clause 16 or 17, wherein the hue adjusting agent is a dichroic dye.
19. A liquid crystal display device comprising:
a liquid crystal cell of VA mode; and
two polarizing plates, wherein the liquid crystal cell is between the two polarizing plate, and at least one of the two polarizing plates is a polarizing plate according to any one of clause 1 to 18,
wherein
the optical compensation sheet of the polarizing plate is disposed on a liquid crystal cell side of the polarizing film,
and a slow axis of the optical compensation sheet and a transmission axis of the polarizing film adjacent to the optical compensation sheet are aligned substantially parallel to each other.
20. A liquid crystal display device comprising:
a liquid crystal cell of VA mode; and
two polarizing plates, wherein the liquid crystal cell is between the two polarizing plate, and at least one of the two polarizing plates is a polarizing plate according to clause 14 or 15,
wherein
the anti-reflection layer is disposed on a viewing side of the polarizing film, and
a slow axis of the optical compensation sheet and a transmission axis of the polarizing film adjacent to the optical compensation sheet are aligned substantially parallel to each other.

Namely, the present inventors have exerted an intensive studies aiming at preventing the hue from being changed into a bluish tint of color at the time of the cross nicol configuration to be generated when the film becomes thin and, as a result, found that the hue approximate to the neutral gray by allowing the transmittance at 700 nm at the time of the cross nicol configuration to be 0.07% or less and the transmittance at 410 nm at the time of the cross nicol configuration to be 0.05% or less and, preferably, 0.02% or less. Further, the present inventors have found it effective as a measure to reduce the transmittance at 700 nm and, also, the transmittance at 410 nm that, in addition to a dichroic substance such as iodine, a dichroic dye having absorption in a corresponding wavelength region (hereinafter, referred to also simply as "hue adjusting agent") is added, or, when the dichromic substance such as iodine is added, a film-hardening agent such as boric acid is added. Still further, the present inventors have found that combinations thereof are also effective.

Meanwhile, the term "substantially parallel" as used herein means a state being in the range of ±5° or less from an exact angle. It is, preferably, in the range of ±4° or less, more preferably in the range of ±3° or less and, most preferably, in the range of ±2° or less.

According to the invention, the polarizing plate which optically compensates the liquid crystal cell while suppressing problems to be derived from downsizing the thickness of the polarizing plate compared with the conventional one and realizes the tint of color approximate to neutral gray can be provided. The polarizing plate according to the invention can enhance viewing angle characteristics by sufficiently optically compensating the liquid crystal cell. The liquid crystal display device according to the invention has the wide viewing angle and the favorable hue.

DETAILED DESCRIPTION OF THE INVENTION

A polarizing plate according to an exemplary embodiment of the invention realizes a favorable hue by preventing a polarization degree of the polarizing plate from being reduced to be less than a predetermined value and, also, by allowing transmittance at 700 nm and 410 nm at the time of a cross nicol configuration to be less than respective values.

Namely, the polarizing plate satisfies the following conditions described in (a), (b) and (c):

(a) the polarization degree P determined by the following formula (1) is 99.9% or more;

(b) the transmittance at 700 nm of two polarizing plates at the time the two polarizing plates are arranged in a cross nicol configuration is 0.07% or less; and (c) the transmittance at 410 nm of the two polarizing plates at the time the two polarizing plates are arranged in the cross nicol configuration is 0.05% or less:

$$\text{polarization degree } P = ((H0-H1)/(H0+H1))^{1/2} \times 100 \quad (1)$$

wherein H0 represents a transmittance (%) of two polarizing plates at the time the two polarizing plates are stacked on each other such that absorption axes of the two polarizing plates are allowed to correspond (or coincide) with each other; and H1 represents a transmittance (%) of two polarizing plates at the time the two polarizing plates are stacked on each other such that absorption axes of the two polarizing plates are allowed to be perpendicular to each other.

<Polarization Degree>

The polarizing degree according to the invention can be measured by using a self-recording spectrophotometer (trade name: UV3100; available from Shimadzu Corporation). The polarization degree can be determined by the above-described formula (1), wherein H0 represents a transmittance (%) at the time two polarizing plates are stacked on each other such that absorption axes of the two polarizing plates are allowed to correspond (or coincide) with each other; and H1 represents a transmittance (%) of the time two polarizing plates are stacked on each other such that absorption axes of the two polarizing plates are allowed to be perpendicular to each other. The polarization degree is subjected to a luminosity correction.

The polarization plate according to the invention can be produced by appropriately selecting a type and an addition method of a hue adjusting agent at the time a polarizing film is produced, as described above, by stretching the polarizing plate having such characteristics as described above, by appropriately adjusting swelling of a polymer film for the polarization plate and, also, by appropriately selecting an addition method of each of a dichroic substance and a film-hardening agent. Hereinafter, specific methods thereof will be described.

<Type and Addition Method of Hue Adjusting Agent>

Types and addition methods of hue adjusting agents for use in the invention are described below.

According to the invention, it is effective to add not only a dichroic substance such as iodine, but also a dichroic dye having absorption in a corresponding wavelength region as a hue adjusting agent.

Specific examples of such dichroic dyes as hue adjusting agents include benzidine type dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151 and C.I. Direct Green 1; diphenyl urea type dyes such as C.I. Direct Yellow 44, C.I. Direct Red 23 and C.I. Direct Red 79; stilbene type dyes such as C.I. Direct Yellow 12; dinaphthylamine type dyes such as C.I. Direct Red 3.1; and J-acid type dyes such as C.I. Direct Red 81, C.I. Direct Violet 9 and C.I. Direct Blue 78.

Other examples thereof than those described above include Direct Yellow 8, Direct Yellow 28, Direct Yellow 86, Direct Yellow 87, Direct Yellow 142, C. I. Direct Orange 26, C.I. Direct Orange 39, C. I. Direct Orange 72, C.I. Direct Orange 106 and C. I. Direct Orange 107; C. I. Direct Red 2, C. I. Direct Red 39, C. I. Direct Red 83, C. I. Direct Red 89, C. I. Direct Red 240, C. I. Direct Red 242, C. I. Direct Red 247, C. I. Direct Violet 48, C. I. Direct Violet 51, C. I. Direct Violet 98, C. I. Direct Blue 15, C. I. Direct Blue 67, C. I. Direct Blue 71, C. I. Direct Blue 98, C. I. Direct Blue 168, C. I. Direct Blue 202, C. I. Direct Blue 236, C. I. Direct Blue 249 and C. I. Direct Blue 270; C. I. Direct Green 59 and C. I. Direct Green 85; C. I. Direct Brown 44, C. I. Direct Brown 106, C. I. Direct Brown 195, C. I. Direct Brown 210, C. I. Direct Brown 223 and C. I. Direct Brown 224; C. I. Direct Black 1, C. I. Direct Black 17, C. I. Direct Black 19 and C. I. Direct Black 54. Still further, dichroic dyes as described in, for example, JP-A Nos. 62-70802, 1-161202, 1-172906, 1-172907, 1-183602, 1-248105, 1-265205 and 7-261024. Among these dichroic dyes, azo type dyes are preferable, and bisazo type dyes and trisazo type dyes are particularly preferable. The hue adjusting agent is, preferably, water-soluble. For this account, a hydrophilic group such as a sulfonic group, an amino group or a hydroxyl group is introduced into a dichroic molecule and the resultant compound is preferably used as being in a form of a free acid, an alkaline metal salt, an ammonium salt or an amine type salt of the compound.

These hue adjusting agents may be used in combinations of any two types or more. The hue adjusting agent to be added performs the object of the invention, so long as it has absorption at 700 nm; however, the hue adjusting agent preferably has main absorption in the range of from 380 nm to 500 nm or from 600 nm to 720 nm. Further, an amount of the dye to be added can discretionarily be determined in accordance with absorbance of the dye to be used, a dichroic ratio and the like. On this occasion, no particular restriction is put in any one of the above-described cases, so long as the transmittance at 700 nm and 410 nm of two polarizing plates at the time the two polarizing plates are arranged in a cross nicol configuration are 0.07% or less and 0.05% or less, respectively.

Further, as for a method for adding the hue adjusting agent to the polarizing film, any one of methods such as a dipping method, a coating method and a spraying method can be used. Among these methods, the dipping method is preferable. A step for adding the hue adjusting agent may be either before stretching or after stretching; however, from the standpoint of an enhancement of polarizing performance, the step before the stretching is preferable. An addition step may be set individually or in a dyeing step, a film-hardening agent addition step or both steps.

<Swelling Adjustment of Polymer Film for Polarizing Plate, Addition Method for Dichroic Substance and Film-Hardening Agent>

Further, the polarizing plate according to the invention can be produced by a swelling step, a dyeing step, a film-hardening step, a stretching step, a drying step, a protective film sticking step and a drying-after-sticking step. In the above-described steps, it is possible to discretionarily change the stated order of the dyeing step, the film-hardening step and the stretching step or to combine two steps or more for simultaneously performing these steps. Particularly, the polarizing plate according to the invention can favorably be produced by performing the swelling step, the dyeing step and the drying step in such a manner as described below in (a) to (c).

(a) In the swelling step, when the polymer film for the polarizing plate is a PVA film, in order to promote dyeing of iodine which is a dichroic substance, the film is previously dipped in water or the like and, on this occasion, a temperature thereof is allowed to be 30 to 50° C. and, more preferably, 35 to 45° C.

(b) The polymer film for the polarizing plate is dyed by using iodine which is a dichroic substance in the dyeing step and, on this occasion, boric acid which is a film-hardening agent is added by 1 to 30 times the amount of iodine on a weight ratio basis.

(c) A stretched polarizing film is dried in the drying step and, on this occasion, a temperature is set to be 70° C. or less and, preferably, 60° C. or less.

<Explanation of Each Step>

(Swelling Step)

The swelling step is preferably performed only by water; however, as described in JP-A-10-153709, in order to stabilize optical properties and to avoid generation of a crease of a polarizing film substrate, it is possible to control a swelling degree of the polarizing film substrate by swelling the polarizing film substrate by using an aqueous boric acid solution.

Further, when the hue adjusting agent is not used, as described above, the temperature is set to be 30 to 50° C. and, preferably, 35 to 45° C. while time duration is set to be 5 to 600 seconds and, preferably, 10 to 300 seconds.

(Dyeing Step)

The dyeing step can use a method as described in JP-A-2002-86554. Further, as for the dyeing method, not only dipping, but also an arbitrary measure such as coating, spraying or the like of iodine or a dye solution is available.

The dichroic substance to be used for dyeing is not particularly limited; however, in order to obtain the polarizing plate having high contrast, it is preferable to perform the dyeing step in a liquid phase by using iodine.

When iodine is used, the dyeing step is performed by dipping a PVA film in an aqueous iodine-potassium iodide solution. It is preferable that iodine is 0.05 to 20 g/L, potassium iodide is 3 to 200 g/L, a ratio by weight of iodine to potassium iodide is 30 to 120, a dyeing period of time is 30 to 600 seconds and a liquid temperature is 20 to 50° C. As described above, it is also effective to add a boron type compound such as boric acid or borax as a film-hardening agent and, when boric acid is used, it is preferable to add boric acid by 1 to 30 times the amount of iodine on a weight ratio basis. Further, in this step, it is effective to add the hue adjusting agent and, on this occasion, an amount thereof is preferably 0.001 to 1 g/L. Still further, since it is important to keep amounts of additives in the aqueous solution to be consistent for the purpose of maintaining the polarizing properties, in a case of a continuous production, it is preferable to continue production while replenishing iodine, potassium iodide, boric acid, the hue adjusting agent and the like. Such replenishment may be performed either in a solution state or a solid state. When the replenishment is performed in the solution state, the solution may be prepared in a concentrated state and used by a small amount according to need.

As described above, it is also effective to simultaneously perform the dyeing step and the film-hardening step to be described below by adding a boron type compound such as boric acid or borax as a film-hardening agent.

(Film-Hardening Step)

In the film-hardening step, it is preferable to dip the film in a cross-linking agent solution or coating it with suing the solution, to thereby allow the cross-linking agent to be contained therein. Further, as described in JP-A-11-52130, the film-hardening step can be divided and, then, performed in a plurality of times.

As for such film-hardening agents, those as described in U.S. Pat. No. 232,897 (reissue) can be used. Further, as described in Japanese Patent No. 3357109, in order to enhance a size stability, a polyvalent aldehyde can be used; however, boric acids are most preferably used.

When boric acid is used as the cross-linking agent in the film-hardening agent, a metallic ion may be added to the aqueous boric acid-potassium iodide solution. As for the metallic ion, zinc chloride is preferable; however, as described in JP-A-2000-35512, a zinc halide such as zinc iodide, or a zinc salt such as zinc sulfate or zinc acetate can also be used in place of zinc chloride.

Preferably, firstly, the aqueous boric acid-potassium iodide solution added with zinc chloride is prepared and, then, the PVA film is dipped in the thus-prepared solution, to thereby perform film-hardening. On this occasion, it is preferable that boric acid is 1 to 100 g/L, potassium iodide is 1 to 120 g/L, zinc chloride is 0.01 to 10 g/L, a film-hardening period of time is 10 to 1200 seconds and a liquid temperature is 10 to 60° C. It is more preferable that boric acid is 10 to 80 g/L, potassium iodide is 5 to 100 g/L, zinc chloride is 0.02 to 8 g/L, the film-hardening period of time is 30 to 600 seconds and the liquid temperature is 20 to 50° C. As described above, it is effective to simultaneously perform the dyeing step by adding the hue adjusting agent in this step. The detail thereof has already been described above.

Since it is important to keep the amounts of the additives in the aqueous solution to be consistent for the purpose of maintaining the polarizing properties, in a case of a continuous production, it is preferable to continue the production while replenishing additives in a same manner as in the dyeing step.

(Stretching Step)

A monoaxial stretching method as described in, for example, U.S. Pat. No. 2,454,515 can be used. According to the invention, an inclined stretching method by means of a tenter technique as described in JP-A-2002-86554 is preferable.

(Drying Step)

Drying conditions are set in accordance with a method as described in JP-A-2002-86554; however, as described above, the temperature is set to be 80° C. or less and, preferably, 70° C. or less. A preferred drying period of time is 30 seconds to 60 minutes.

(Protective Film Sticking Step)

According to the invention, the polarizing film produced in a manner as described above is used as the polarizing plate, after stuck to a protective film, together with the optical compensatory sheet having a cellulose acylate, on one face or each face thereof. Types of such protective films are not particularly limited and cellulose types such as cellulose acetate, cellulose acetate butyrate and cellulose propionate; polycarbonates; polyolefins; polystyrene; polyesters and the like can be used. As for commercial articles, Fujitac available from Fuji Photo Film Co., Ltd., a triacetyl cellulose film available from Konica Corporation, Zeonor available from Zeon Corporation, ARTON available from JSR corporation and the like can be used.

Other articles than those described above, non-birefringent optical resin materials as described in, for example, JP-A Nos. 8-110402 and 11-293116 are mentioned.

In the protective film of the polarizing plate, such properties as transparency, an appropriate moisture permeability, a low birefringence and an appropriate rigidity are required, and film thickness thereof is, from the standpoint of handling convenience or durability, preferably in the range of from 5 to 500 μm, more preferably in the range of from 20 to 200 μm and, particularly preferably, in the range of from 20 to 100 μm.

Adhesives to be used between the polarizing plate and the protective film are not particularly limited and a PVA type resin (inclusive of a modified FVA resin introduced with an acetoacetyl group, a sulfonic acid group, a carboxyl group or an oxyalkylene group), an aqueous solution of a boron type compound and the like are mentioned and, among them, the PVA resin is preferable.

For sticking the polarizing film to the protective film, it is preferable to supply an adhesive solution immediately before the sticking and to stack them by using a pair of rolls such that they are placed one on the other.

Thickness of an adhesive layer is preferably 0.001 to 5 μm and, particularly preferable, 0.005 to 3 μm. Further, as described in JP-A Nos. 2001-296426 and 2002-86554, in order to suppress irregularity in a form of a record groove to be caused by stretching the polarizing film, it is preferably to adjust a moisture content in the polarizing film at the time of the lamination and, according to the invention, the moisture content therein is preferably 0.1 to 30%.

(Drying-after-Sticking Step)

Drying conditions after the sticking are set in accordance with a method as described in JP-A-2002-86554. It is preferable that a preferred temperature range is 30 to 100° C. and a preferred drying period of time is 30 seconds to 60 minutes.

In the polarizing plate according to the invention, as for contents of elements in the polarizing film, it is preferable that iodine is 0.1 to 3.0 g/m$^2$, boron is 0.1 to 5.0 g/m$^2$, potassium is 0.1 to 2.0 g/m$^2$ and zinc is 0.001 to 2.0 g/m$^2$.

<Polymer Film for Polarizing Film>

The polymer film for polarizing film to be used in the invention is preferably a PVA film.

PVA is a saponification product of polyvinyl acetate. PVA may comprise a component copolymerizable with vinyl acetate such as unsaturated carboxylic acid, unsaturated sulfonic acid, olefin and vinylether incorporated therein. Further, a modified PVA comprising an acetoacetyl group, sulfonic acid group, carboxyl group, oxyalkylene group or the like incorporated therein may be used.

The saponification degree of PVA is not specifically limited but is preferably from 80 to 100 mol-%, particularly from 90 to 100 mol-% from the standpoint of solubility, etc. The polymerization degree of PVA is not specifically limited but is preferably from 1,000 to 10,000, particularly from 1,500 to 5,000.

The crystallization degree of PVA film is not specifically limited. By way of example, a PVA film having an average crystallization degree (Xc) of from 50 to 75% by weight as described in Japanese Patent No. 3,251,073 is preferably used. As described in JP-A-2002-236214, in order to eliminate the in-plane dispersion of hue, a PVA film having a crystallization degree of 38% or less is preferably used.

The birefringence (Δn) of the PVA film is preferably as small as possible. As described in Japanese Patent No. 3,342,516, a PVA film having a birefringence of $1.0 \times 10^{-3}$ or less is preferably used. However, as described in JP-A-2002-228835, in order to attain a high polarization degree while avoiding the breakage of PVA film during stretching, the birefringence of the PVA film may be predetermined to be from not smaller than 0.02 to not greater than 0.01.

As described in Japanese Patent No. 2,978,219, a PVA film having a syndiotacticity of 55% or more is preferably used to enhance the durability thereof. As described in Japanese Patent No. 3,317,494, a PVA film having a syndiotacticity of from 45 to 52.5 mol-% may be used.

The polarizing plate of the invention may preferably comprise a PVA film having 1,2-glycol bonded thereto in an amount of 1.5 mol-% or less as described in Japanese Patent No. 3,021,494, a PVA film comprising optical foreign materials having a size of 5 μm or more in a proportion of 500 particles per 100 cm$^2$ as described in JP-A-2001-316492, a PVA film having a hot water cutting temperature of 1.5° C. or less in TD direction as described in JP-A-2002-30163 or a PVA film prepared from a solution having a plasticizer incorporated therein as described in JP-A-6-298225 incorporated therein besides these PVA films.

As a method of producing PVA film there is normally used preferably a method which comprises casting a stock solution obtained by dissolving a PVA-based resin in water or an organic solvent. The concentration of the polyvinyl alcohol-based resin in the stock solution is normally from 5 to 20% by weight. By casting the stock solution, a PVA film having a thickness of from 10 to 200 μm can be produced. For the details of the production of PVA film, reference can be made to Japanese Patent No. 3,342,516, JP-A-9-328593, JP-A-2001-302817, and JP-A-2002-144401.

(Configuration of Polarizing Plate)

The protective film for the polarizing plate of the invention or the optical compensation sheet made of cellulose acylate may have an arbitrary functional layer such as a reflecting polarizer, an optically anisotropic layer for compensating the viewing angle of LCD as disclosed in JP-A-4-229828, JP-A-6-75115 and JP-A-8-50206, an anti-glare or anti-reflection layer for enhancing the viewability of display, a hard coat layer for enhancing the scratch resistance of the polarizing plate, a gas barrier layer for inhibiting the dispersion or water or oxygen, an easily bondable layer for enhancing the adhesion to the polarizing film or adhesive agent and a layer for providing slipperiness provided on the surface thereof.

As the protective film for polarizing plate there may be used one or a layered product of the aforementioned preferred protective films. The same protective film may be stuck to the both sides of the polarizing film. Alternatively, protective films having different functions and physical properties may be stuck to the respective side of the polarizing film.

(Adhesive Layer)

The aforementioned adhesive layer to be provided to stick the polarizing plate of the invention directly to the liquid crystal cell is a layer which exhibits a proper viscoelasticity or adhesivity, not to mention optical transparency. The adhesive layer of the invention can be formed by spreading a coating solution made of an acryl-based copolymer, epoxy-based resin, polyurethane, silicon-based polymer, polyether, butyral-based resin, polyamide-based resin, polyvinyl alcohol-based resin or polymer composition containing a synthetic rubber over a polarizing film, and then drying the coat layer by drying method, chemical curing method, thermosetting method, heat fusion method, photo-setting method or the like. In particular, an acryl-based copolymer is preferably used because it allows easy control over adhesive properties and is excellent in transparency, weathering resistance and durability.

<Optical Compensatory Sheet>

As described above, the polarizing plate according to the invention satisfies conditions described in the above-described (a), (b) and (c) and at least one of the two transparent protective films provided one on each face of the polarizing plate is the optical compensatory sheet containing the cellulose acylate film.

In order to used the cellulose acylate film as the optical compensatory sheet, it is preferable to adjust retardation. Hereinafter, the retardation will be described. Retardation of optical compensatory sheet An Re retardation value and an Rth retardation value are defined by the following formulae (2) and (3), respectively:

$$Re = (nx - ny) \times d \quad (2)$$

$$Rth = \{(nx + ny)/2 - nz\} \times d \quad (3)$$

wherein nx represents an in-plane refractive index in a direction of slow axis (a direction in which the refractive index is maximum);

ny represents an in-plane refractive index in a direction of fast axis (a direction in which the refractive index is minimum);

nz represents the refractive index of the optical compensation sheet in a thickness direction (a direction perpendicular to the film); and d represents a thickness of the film represented by nm.

According to the invention, it is preferable to adjust the Re retardation value and the Rth retardation value of the cellulose acylate film to be in the range of from 20 to 80 nm and in the range of from 70 to 400 nm, respectively. It is more preferable to adjust the Re retardation value and the Rth retardation value of the cellulose acylate film to be in the range of from 40 to 70 nm and in the range of from 90 to 300 nm, respectively. Further, according to the invention, an Re/Rth ratio is adjusted to be preferably in the range of from 0.1 to 0.5, more preferably in the range of from 0.2 to 0.4 and, still more preferably, in the range of from 0.3 to 0.4.

In such adjustments as described above, these ranges can be realized by appropriately adjusting a substitution degree of the cellulose acylate film, a type and an amount of an additive to be added to the cellulose acylate film or production conditions (for example, stretching conditions of the film). Particularly, it is preferable that the additive is a compound having at least two aromatic rings and the compound is a rod-shaped compound having a linear molecular structure. It is preferable that, in the production conditions, adjustment is performed by means of a draw ratio.

According to the invention, it is possible to set a variation of the Re/Rth ratio per 1% of the draw ratio to be 0.01 to 0.1. On this occasion, the variation of the Re/Rth ratio per 1% of the draw ratio can be determined from an inclination obtained by performing a primary approximation on the Re/Rth ratios against at least 3 points of the draw ratios of 5% or more. The adjustment of the amount of Re/Rth change can be performed by changing the acetylation degree, adjusting the substitution degrees A and B to be hereinafter described, selecting acyl groups of the cellulose acylate (butyryl or propionyl), or adding a compound having an aromatic ring, etc.

Further, the birefringence (nx−ny) of the cellulose acylate film is preferably 0.0002 to 0.0009, more preferably 0.00025 to 0.0009 and, most preferably, 0.00035 to 0.0009. Still further, the birefringence $\{(nx+ny)/2-nz\}$ in a thickness direction of the cellulose acylate film is preferably 0.0006 to 0.005, more preferably 0.0008 to 0.005 and, most preferably, 0.0012 to 0.005.

(Moisture Permeability of Optical Compensation Sheet)

In the invention, the moisture permeability of the optical compensation sheet is preferably adjusted to 700 g/m$^2$·day or less, more preferably 500 g/m$^2$·day or less at 40° C. and 90% RH.

For the measurement of moisture permeability, the method described in "Physical Properties of Polymers II", Institute of Polymer Experiment 4, Kyoritshu Shuppan, pp. 285-294: Measurement of Vapor Moisture (weight method, thermometer method, vapor pressure method, adsorption method) can be used.

The adjustment of moisture permeability can be carried out by properly adjusting the kind and amount of the additives in the cellulose acylate film to the above defined range. It is particularly preferred that the moisture permeability be adjusted with a retardation adjustor.

(Cellulose Acylate Composition)

The compounds to be incorporated in the composition from which the cellulose acylate film is prepared will be sequentially described hereinafter.

(Cellulose Acylate)

As a cotton from which the cellulose acylate of the invention is produced there may be used any known cotton material (as disclosed in Kokai Giho No. 2001-1745, Japan Institute of Invention and Innovation). Further, the synthesis of the cellulose acylate can be attained by any known method (as disclosed in Migita et al, "Wood Chemistry", pp. 180-190, Kyoritsu Shuppan, 1968). The viscosity-average polymerization degree of the cellulose acylate is preferably from 200 to 700, more preferably from 250 to 500, most preferably from 250 to 350. The distribution of molecular weight Mw/Mn (w: weight-average molecular weight; Mn: number-average molecular weight) of the cellulose acylate to be used in the invention is preferably sharp as determined by gel permeation chromatography. In some detail, Mw/Mn is preferably from 1.5 to 5.0, more preferably from 2.0 to 4.5, most preferably from 3.0 to 4.0.

The cellulose acylate to be used in the invention is preferably a cellulose acylate wherein the degree of substitution of hydroxyl group in cellulose satisfies formulae (4) and (5):

$$2.0 \leq A+B \leq 3.0 \tag{4}$$

$$0 \leq B \tag{5}$$

wherein A and B each represent the degree of substitution of hydroxyl group by acyl groups in cellulose in which A represents the degree of substitution by an acetyl group; and B represents the degree of substitution by an acyl group having 3 or more carbon atoms, preferably $C_3$-$C_{22}$ acyl groups.

The β-1,4-bonded glucose unit constituting the cellulose has a free hydroxyl group in the 2-, 3- and 6-positions. The cellulose acylate is a polymer obtained by esterification of some or whole of these hydroxyl groups by acyl group. The degree of substitution by acyl group means the ratio of esterification of cellulose each in the 2-, 3- and 6-positions (100% esterification means a substitution degree of 1).

In the invention, the sum of the degrees A and B of substitution of hydroxyl group is preferably from 2.2 to 2.86, particularly from 2.40 to 2.80. The degree B of substitution is preferably 0 or more, more preferably 1.3 or more, still more preferably 1.50 or more, particularly 1.7 or more. Referring further to B, the hydroxyl groups in the 6-position are preferably substituted in a proportion of not smaller than 28%, more preferably not smaller than 30%, even more preferably not smaller than 31%, particularly not smaller than 32%. Further, the sum of the degrees A and B of substitution in the 6-position of cellulose acylate is preferably 0.75 or more, more preferably 0.80 or more, particularly 0.85 or more.

Particularly preferable cellulose acylates among those cited above are such that satisfy the following formulae (I) and (II) in which DS2 represents the degree of substitution of the hydroxyl group in the 2-position for the glucose unit of cellulose by acyl groups having 2 or more carbon atoms (i.e., an acetyl group and an acyl group having 3 or more carbon atoms), DS3 represents the degree of substitution of the hydroxyl group in the 3-position by acetyl groups, and DS6 represents the degree of substitution of the hydroxyl group at the 6-position by acetyl group and an acyl group with 3 or more carbon atoms.

$$2.0 \leq DS2+DS3+DS6 \leq 3.0 \tag{I}$$

$$DS6/(DS2+DS3+DS6) \geq 0.315 \tag{II}$$

The cellulose acylate satisfying formulae (I) and (II), which readily develops retardation, is preferable for the invention.

The acyl group in the aforementioned cellulose acylate film is not specifically limited but is preferably an acetyl group, propionyl group or butyryl group. The term "degree of substitution of acyl group" as used herein is meant to indicate the value calculated according to ASTM D817.

In the case where a cellulose acetate having an acetyl group as an acyl group is used, the acetylation degree is preferably from 59.0 to 62.5%, more preferably from 59.0 to 61.5%. When the acetylation degree falls within this range, Re is not greater than the desired value due to conveyance tension during casting. Further, there occurs little in-plane dispersion of Re. Moreover, there occurs little change of retardation value with temperature and humidity.

(Retardation Adjustor)

In order to adjust the retardation value of the cellulose acylate film, it is preferred that an aromatic compound having at least two aromatic rings be used as a retardation adjustor. The aromatic compound is preferably used in an amount of from 0.01 to 20 parts by weight, more preferably from 1 to 20 parts by weight based on 100 parts by weight of cellulose acylate. Two or more aromatic compounds may be used in combination. The aromatic rings in the aromatic compound include aromatic heterocyclic groups in addition to aromatic hydrocarbon rings.

The aromatic hydrocarbon ring is particularly preferably a 6-membered ring (i.e., benzene ring). The aromatic heterocyclic group is normally an unsaturated heterocyclic group, preferably a 5-membered, 6-membered or 7-membered ring, more preferably a 5-membered ring or 6-membered ring.

The aromatic heterocyclic group normally has most numerous double bonds. As the hetero atoms there are preferably nitrogen atom, oxygen atom and sulfur atom, particularly nitrogen atom. Examples of the aromatic heterocyclic group include furane ring, thiophene ring, pyrrole ring, oxazole ring, isooxazole ring, thiazole ring, isothiazole ring, imidazole ring, pyrazole ring, furazane ring, triazole ring, pyrane ring, pyridine ring, pyridazine ring, pyrimidine ring, pyrazine ring, and 1,3,5-triazine ring. Preferred examples of the aromatic ring include benzene ring, furane ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. It is particularly preferred that the aromatic compound have at least one 1,3,5-triazine ring.

The number of aromatic rings contained in the aforementioned aromatic compound is preferably from 2 to 20, more preferably from 2 to 12, even more preferably from 2 to 8, most preferably from 2 to 6. Referring to the connection of two aromatic rings, (a) they may form a condensed ring, (b) they may be connected directly to each other by a single bond or (c) they may be connected to each other via a connecting group (No spiro bond cannot be formed due to aromatic ring). Any of the connections (a) to (c) may be established.

Preferred examples of the condensed ring (a) (formed by the condensation of two or more aromatic rings) include indene ring, naphthalene ring, azlene ring, fluorene ring, phenathrene ring, anthracene ring, acenaphthylene ring, biphenylene ring, naphthacene ring, pyrene ring, indole ring, isoindole ring, benzofurane ring, benzothiophene ring, benzotriazole ring, purine ring, indazole ring, chromene ring, quinoline ring, isoquinoline ring, quinolidine ring, quinazoline ring, cinnoline ring, quinoxaline ring, phthaladine ring, puteridine ring, carbazole ring, acridine ring, phenathridine, xanthene ring, phenazine ring, phenothiazine ring, phenoxathine ring, phenoxazine ring, and thianthrene ring. Preferred among these condensed rings are naphthalene ring, azlene ring, indole ring, benzooxazole ring, benzothiazole ring, benzoimidazole ring, benzotriazole ring, and quinoline ring.

The single bond (b) is preferably a bond between the carbon atom of two aromatic rings. Two or more aromatic rings may be connected via two or more single bonds to form an aliphatic ring or nonaromatic heterocyclic group between the two aromatic rings.

The connecting group (c), too, is preferably connected to the carbon atom of two aromatic rings. The connecting group is preferably an alkylene group, alkenylene group, alkynylene group, —CO—, —O—, —NH—, —S— or combination thereof. Examples of the connecting group comprising these groups in combination will be given below. The order of the arrangement of components in the following connecting groups may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and connecting group may have substituents. Examples of the substituents include halogen atoms (F, Cl, Br, I), hydroxyl groups, carboxyl groups, cyano groups, amino groups, sulfo groups, carbamoyl groups, sulfamoyl groups, ureido groups, alkyl groups, alkenyl groups, alkinyl groups, aliphatic acyl groups, aliphatic acyloxy groups, alkoxy groups, alkoxycarbonyl groups, alkoxycarbonylamino groups, alkylthio groups, alkylsulfonyl groups, aliphatic amide groups, aliphatic sulfonamide groups, aliphatic substituted amino groups, aliphatic substituted carbamoyl groups, aliphatic substituted sulfamoyl groups, aliphatic substituted ureido groups, and nonaromatic heterocyclic groups.

The number of carbon atoms in the alkyl group is preferably from 1 to 8. A chain-like alkyl group is preferred to cyclic alkyl group. A straight-chain alkyl group is particularly preferred. The alkyl group preferably further has substituents (e.g., hydroxy group, carboxy group, alkoxy group, alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group, and 2-diethylaminoethyl group.

The number of carbon atoms in the alkenyl group is preferably from 2 to 8. A chain-like alkinyl group is preferred to cyclic alkenyl group. A straight-chain alkenyl group is particularly preferred. The alkenyl group may further have substituents. Examples of the alkenyl group include vinyl group, allyl group, and 1-hexenyl group. The number of carbon atoms in the alkinyl group is preferably from 2 to 8. A chain-like alkinyl group is preferred to cyclic alkinyl group. A straight-chain alkinyl group is particularly preferred. The alkinyl group may further have substituents. Examples of the alkinyl group include ethinyl group, 1-butinyl group, and 1-hexinyl group.

The number of carbon atoms in the aliphatic acyl group is preferably from 1 to 10. Examples of the aliphatic acyl group include acetyl group, propanoyl group, and butanoyl group. The number of carbon atoms in the aliphatic acyloxy group is preferably from 1 to 10. Examples of the aliphatic acyloxy group include acetoxy group. The number of carbon atoms in the alkoxy group is preferably from 1 to 8. The alkoxy group may further has substituents (e.g., alkoxy group). Examples of the alkoxy group (including substituted alkoxy groups) include methoxy group, ethoxy group, butoxy group, and methoxyethoxy group. The number of carbon atoms in the alkoxycarbonyl group is preferably from 2 to 10. Examples of the alkoxycarbonyl group include methoxycarbonyl group, and ethoxycarbonyl group. The number of carbon atoms in the alkoxycarbonylamino group is preferably from 2 to 10. Examples of the alkoxycarbonylamino group include methoxycarbonylamino group, and ethoxycarbonylamino group.

The number of carbon atoms in the alkylthio group is preferably from 1 to 12. Examples of the alkylthio group include methylthio group, ethylthio group, and octylthio group. The number of carbon atoms in the alkylsulfonyl group is preferably from 1 to 8. Examples of the alkylsulfonyl group include methanesulfonyl group, and ethanesulfonyl group. The number of carbon atoms in the aliphatic amide group is preferably from 1 to 10. Examples of the aliphatic amide group include acetamide group. The number of carbon atoms in the aliphatic sulfonamide group is preferably from 1 to 8. Examples of the aliphatic sulfonamide group include methanesulfonamide group, butanesulfonamide group, and n-octanesulfonamide group. The number of carbon atoms in the aliphatic substituted amino group is preferably from 1 to 10. Examples of the aliphatic substituted amino group include dimethylamino group, diethylamino group, and 2-carboxyethylamino group.

The number of carbon atoms in the aliphatic substituted carbamoyl group is preferably from 2 to 10. Examples of the aliphatic substituted carbamoyl group include methylcarbamoyl group, and diethylcarbamoyl group. The number of carbon atoms in the aliphatic substituted sulfamoyl group is preferably from 1 to 8. Examples of the aliphatic substituted sulfamoyl group include methylsulfamoyl group, and diethylsulfamoyl group. The number of carbon atoms in the aliphatic substituted ureido group is preferably from 2 to 10. Examples of the aliphatic substituted ureido group include methylureido group. Examples of the nonaromatic heterocyclic group include piperidino group, and morpholino group. The molecular weight of the retardation developer is preferably from 300 to 800.

As the retardation adjustor to be used in the invention there may be used a rod-shaped compound having at least two aromatic rings. The aforementioned rod-shaped compound preferably has a linear molecular structure. The term "linear molecular structure" as used herein is meant to indicate that the molecular structure of the rod-shaped compound which is most thermodynamically stable is linear. The most thermodynamically stable structure can be determined by crystallographic structure analysis or molecular orbital calculation. For example, a molecular orbital calculation software (e.g., WinMOPAC2000, produced by Fujitsu Co., Ltd.) may be used to effect molecular orbital calculation, making it possible to determine a molecular structure allowing the minimization of heat formation of compound. The term "linear molecular structure" as used herein also means that the most thermodynamically stable molecular structure thus calculated forms a main chain at an angle of 140 degrees or more.

As the rod-shaped compound having at least two aromatic rings there is preferably used a compound represented by formula (1):

$$Ar^1-L^1-Ar^2 \qquad (I)$$

wherein $Ar^1$ and $Ar^2$ each independently represent an aromatic ring.

Examples of the aromatic ring employable herein include aryl groups (aromatic hydrocarbon group), substituted aryl groups, and substituted aromatic heterocyclic groups. The aryl group and substituted aryl group are preferred to the aromatic heterocyclic group and substituted aromatic heterocyclic group.

The heterocyclic group in the aromatic heterocyclic group is normally unsaturated. The aromatic heterocyclic group is preferably a 5-membered ring, 6-membered ring or 7-membered ring, more preferably a 5-membered ring or 6-membered ring. The aromatic heterocyclic group normally has the most numerous double bonds. The hetero atom is preferably nitrogen atom, oxygen atom or sulfur atom, more preferably nitrogen atom or sulfur atom. Preferred examples of the aromatic ring in the aromatic group include furane ring, thiophene ring, pyrrole ring, oxazole ring, isooxazole ring, thiazole ring, isothiazole ring, imidazole ring, pyrazole ring, furazane ring, triazole ring, pyrane ring, pyridine ring, pyridazine ring, pyrimidine ring, pyrazine ring, and 1,3,5-triazine ring.

Preferred examples of the aromatic ring in the aromatic group include benzene ring, furane ring, thiophene ring, pyrrole ring, oxazole ring, thiazole ring, imidazole ring, triazole ring, pyridine ring, pyrimidine ring, and pyrazine ring. Particularly preferred among these aromatic rings is benzene ring.

Examples of the substituents on the substituted aryl group and substituted aromatic heterocyclic group include halogen atoms (F, Cl, Br, I), hydroxyl groups, carboxyl groups, cyano groups, amino groups, alkylamino groups (e.g., methylamino group, ethylamino group, butylamino group, dimethylamino group), nitro groups, sulfo groups, carbamoyl groups, alkylcarbamoyl groups (e.g., N-methylcarbamoyl group, N-ethylcarbamoyl group, N,N-dimethylcarbamoyl group), sulfamoyl groups, alkylsulfamoyl groups (e.g., N-methylsulfamoyl group, N-ethylsulfamoyl group, N,N-dimethylsulfamoyl group), ureido groups, alkylureido groups (e.g., N-methylureido group, N,N-dimethylureido group, N,N,N'-trimethyl ureido group), alkyl groups (e.g., methyl group, ethyl group, propyl group, butyl group, pentyl group, heptyl group, octyl group, isopropyl group, s-butyl group, t-amyl group, cyclohexyl group, cyclopentyl group), alkenyl groups (e.g., vinyl group, allyl group, hexenyl group), alkinyl groups (e.g., ethinyl group, butinyl group), acyl groups (e.g., formyl group, acetyl group, butyryl group, hexanoyl group, lauryl group), acyloxy groups (e.g., acetoxy group, butyryloxy group, hexanoyloxy group, lauryloxy group), alkoxy groups (e.g., methoxy group, ethoxy group, propoxy group, butoxy group, pentyloxy group, heptyloxy group, octyloxy group), aryloxy groups (e.g., phenoxy group), alkoxycarbonyl groups (e.g., methoxycarbonyl group, ethoxycarbonyl group, propoxycarbonyl group, butoxycarbonyl group, pentyloxycarbonyl group, heptyloxycarbonyl group), aryloxycarbonyl groups (e.g., phenoxycarbonyl group), alkoxycarbonylamino groups (e.g., butoxycarbonylamino group, hexyloxycarbonylamino group), alkylthio groups (e.g., methylthio group, ethylthio group, propylthio group, butylthio group, pentylthio group, heptylthio group, octylthio group), arylthio groups (e.g., phenylthio group), alkylsulfonyl groups (e.g., methyl sulfonyl group, ethylsulfonyl group, propylsulfonyl group, butylsulfonyl group, pentylsulfonyl group, heptylsulfonyl group, octylsulfonyl group), amide groups (e.g., acetamide group, butylamide group, hexylamide group, laurylamide group), and nonaromatic heterocyclic groups (e.g., morpholyl group, pyradinyl group).

Examples of the substituents on the substituted aryl group and substituted aromatic heterocyclic group include halogen atoms, cyano groups, carboxyl groups, hydroxyl groups, amino groups, alkyl-substituted amino groups, acyl groups, acyloxy groups, amide groups, alkoxycarbonyl groups, alkoxy groups, alkylthio groups, and alkyl groups.

The alkyl moiety and alkyl group in the alkylamino group, alkoxycarbonyl group, alkoxy group and alkylthio group may further have substituents. Examples of the substituents on the alkyl moiety and alkyl group include halogen atoms, hydroxyl groups, carboxyl groups, cyano groups, amino groups, alkylamino groups, nitro groups, sulfo groups, carbamoyl groups, alkylcarbamoyl groups, sulfamoyl groups, alkylsulfamoyl groups, ureido groups, alkylureido groups, alkenyl groups, alkinyl groups, acyl groups, acyloxy groups, acylamino groups, alkoxy groups, aryloxy groups, alkoxycarbonyl groups, aryloxycarbonyl groups, alkylthio groups, arylthio groups, alkylsulfonyl groups, amide groups, and nonaromatic heterocyclic groups. Preferred among these substituents on the alkyl moiety and alkyl group are halogen atoms, hydroxyl groups, amino groups, alkylamino groups, acyl groups, acyloxy groups, acylamino groups, and alkoxy groups.

In formula (I), $L^1$ represents a divalent connecting group selected from the group consisting of groups composed of alkylene group, alkenylene group, alkynylene group, arylene group, —O—, —CO— and combination thereof.

The alkylene group may have a cyclic structure. The cyclic alkylene group is preferably cyclohexylene, particularly 1,4-cyclohexylene. As the chain-like alkylene group, a straight-chain alkylene is preferred to a branched alkylene. The number of carbon atoms in the alkylene group is preferably from 1 to 20, more preferably from 1 to 15, even more preferably from 1 to 10, even more preferably from 1 to 8, most preferably from 1 to 6.

The alkenylene group and alkynylene group preferably has a chain-like structure rather than cyclic structure, more preferably a straight-chain structure than branched chain-like structure. The number of carbon atoms in the alkenylene group and alkynylene group is preferably from 2 to 10, more preferably from 2 to 8, even more preferably from 2 to 6, even more preferably from 2 to 4, most preferably 2 (vinylene or ethinylene).

The number of carbon atoms in the arylene group is preferably from 6 to 20, more preferably from 6 to 16, even more preferably from 6 to 12.

L1 in the aforementioned formula (I) may be a divalent connecting group comprising these groups in combination. Examples of such a divalent connecting group will be given below.

L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—
L-7: —O—CO-arylene group-CO—O—
L-8: —CO—O-arylene group-O—CO—
L-9: —O—CO-arylene group-CO—O—
L-10: —CO—O-arylene group-O—CO—

In the molecular structure of formula (I), the angle formed by $Ar^1$ and $Ar^2$ with $L^1$ interposed therebetween is preferably 140 degrees or more.

The rod-shaped compound is more preferably a compound represented by the following formula (II):

$$Ar^1\text{-}L^2\text{-}X\text{-}L^3\text{-}Ar^2 \qquad (II)$$

wherein $Ar^1$ and $Ar^2$ each independently represent an aromatic group. The definition and examples of the aromatic group are similar to that of $Ar^1$ and $Ar^2$ in formula (I).

In formula (II), $L^2$ and $L^3$ each independently represent a divalent connecting group selected from the group consisting of groups formed by alkylene group, —O—, —CO— and combination thereof. The alkylene group preferably has a chain-like structure rather than cyclic structure, more preferably a straight-chain structure rather than branched chain-like structure. The number of carbon atoms in the alkylene group is preferably from 1 to 10, more preferably from 1 to 8, even more preferably from 1 to 6, even more preferably from 1 to 4, most preferably 2 (methylene or ethylene).

$L^2$ and $L^3$ each are preferably —O—CO— or —CO—O— in particular.

In formula (II), X represents 1,4-cyclohexylene, vinylene or ethinylene.

Specific examples of the compound represented by formula (I) or (II) will be given below.

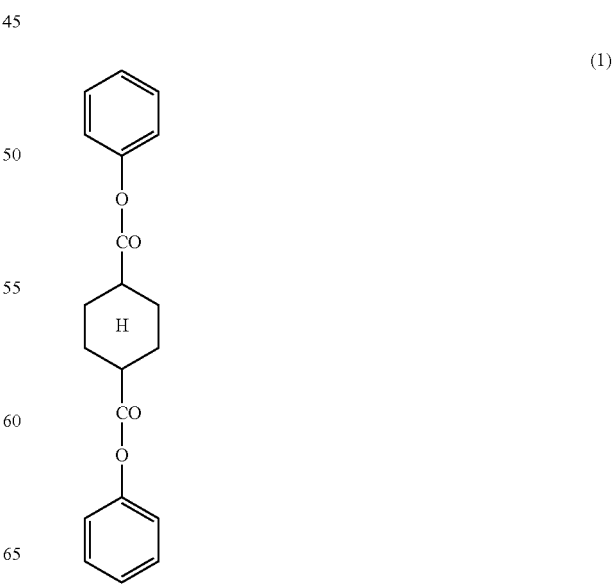

(1)

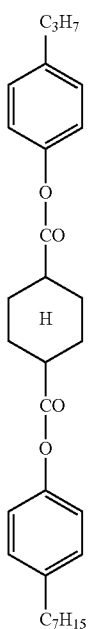
(2)
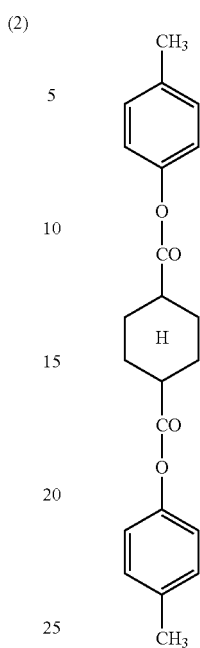
(4)
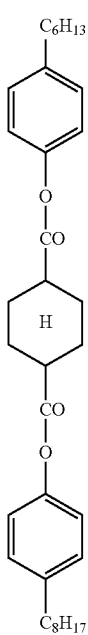
(3)
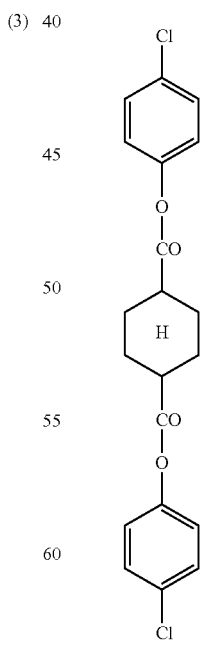
(5)

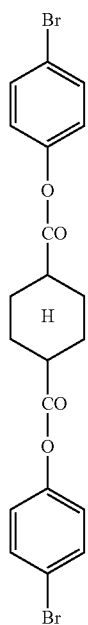 (6)
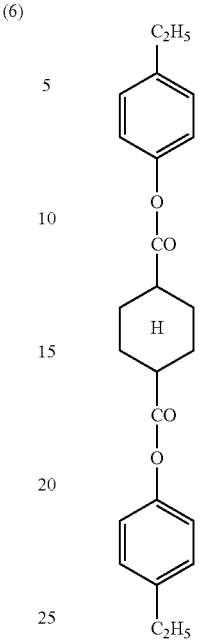 (8)
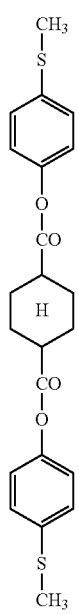 (7)
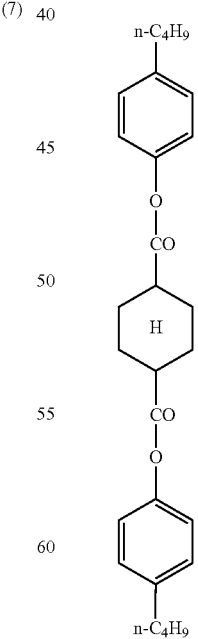 (9)

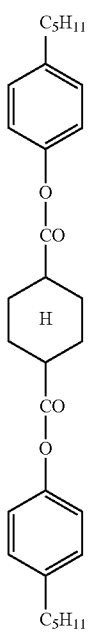
(10)
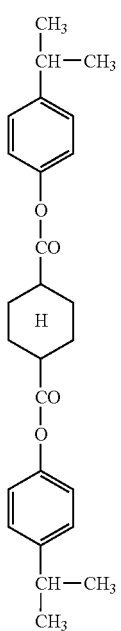
(11)
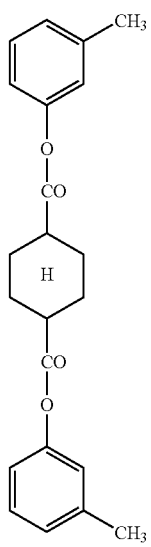
(12)
(13)

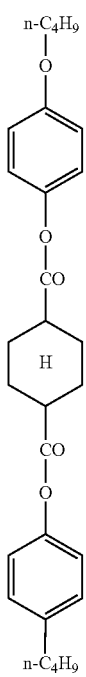
(14)
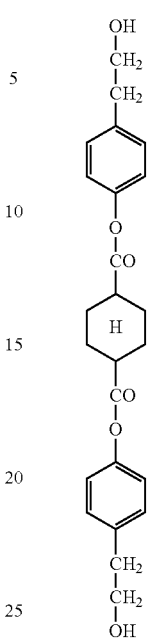
(16)
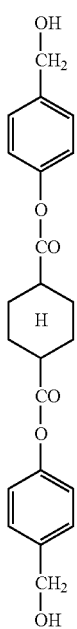
(15)
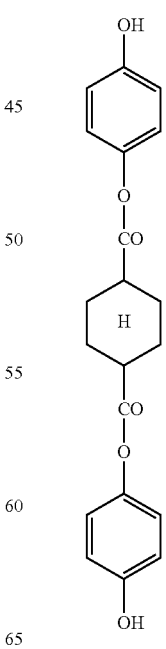
(17)

(18)
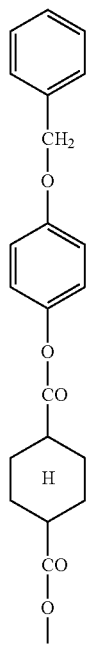
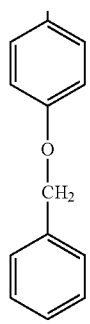
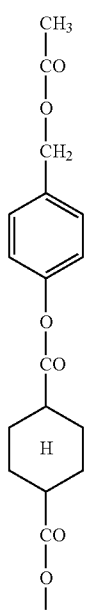
(19)
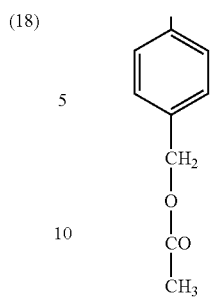
(20)
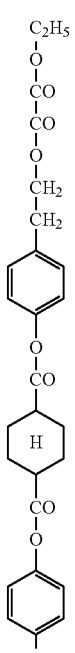
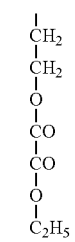

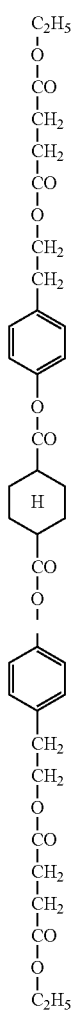
(21)
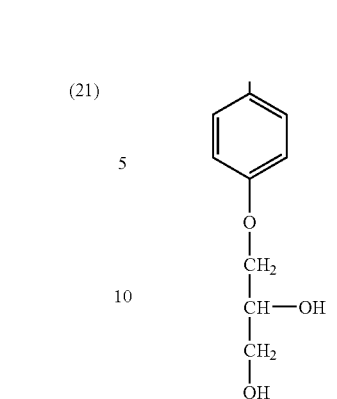
(22)
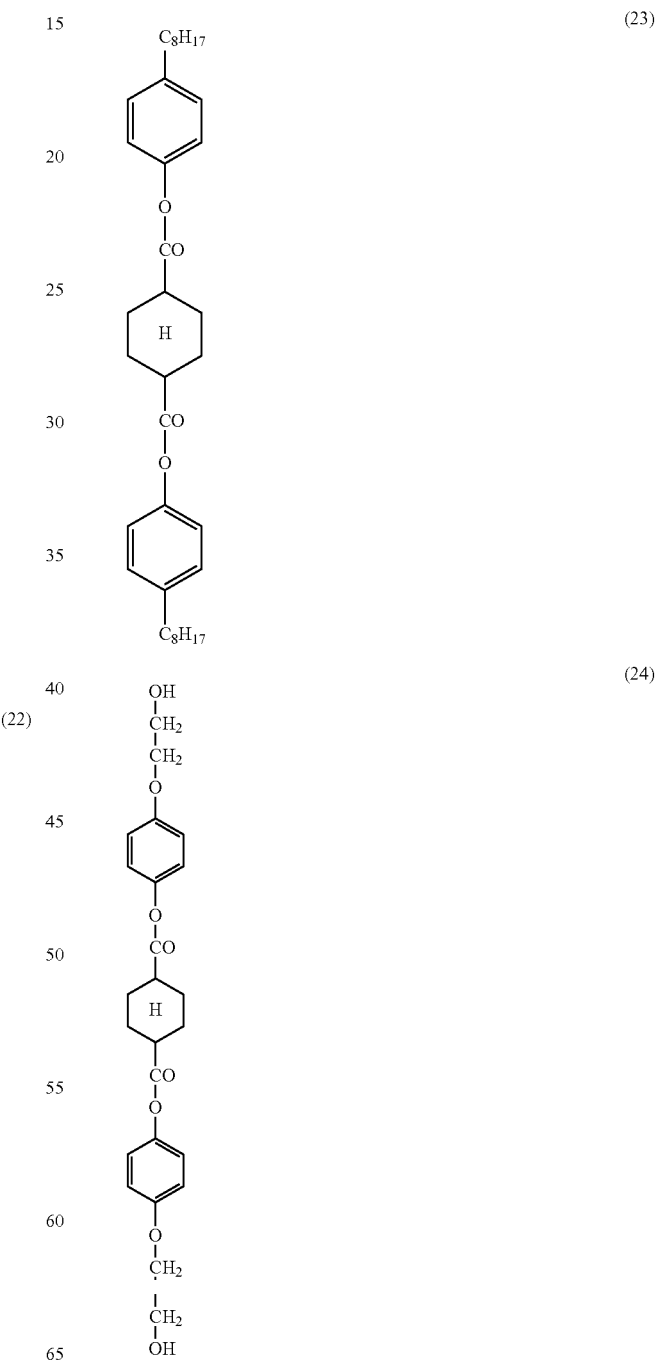

(25)
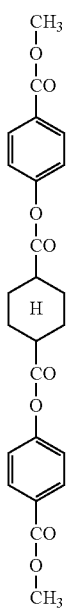
(27)
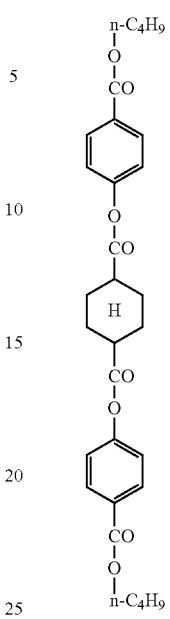
(26)
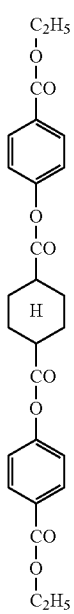
(28)
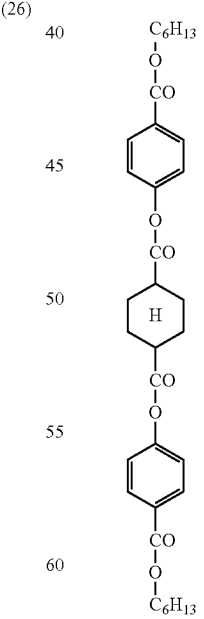

 (29)
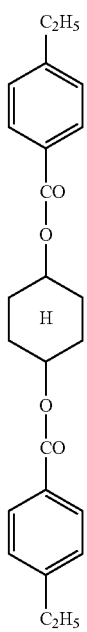 (31)
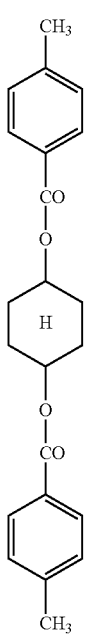 (30)
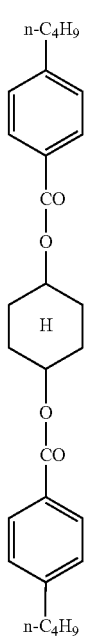 (32)

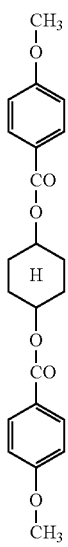
(33)
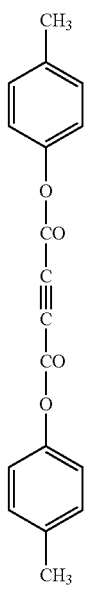
(36)
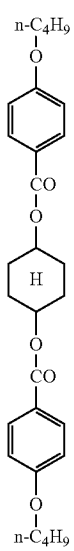
(34)
(35)
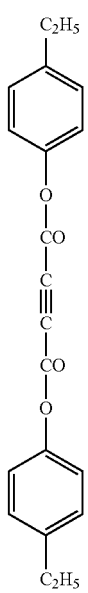
(37)

(38)
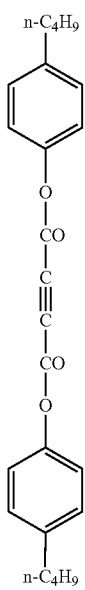
(39)
(40)
(41)
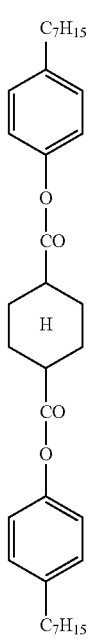
(42)
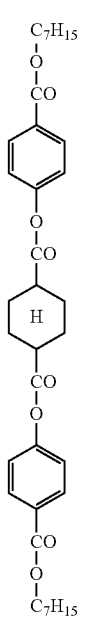

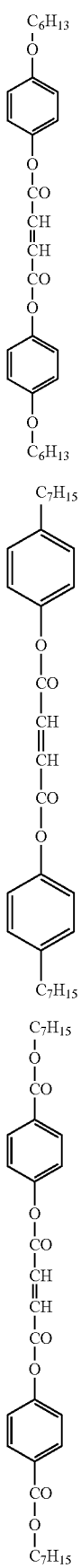

(43)

(44)

(45)

The specific examples (1) to (34), (41) and (42) each have two asymmetric carbon atoms in the 1-position and 4-position of cyclohexanone ring. However, the specific examples (1), (4) to (34), (41) and (42) each have a symmetric meso type molecular structure and thus has no optical isomers material (optical activity) but only geometrical isomers (trans type and cis type). Examples of trans type (1-trans) and cis type (1 cis) of the specific example (1) will be given below.

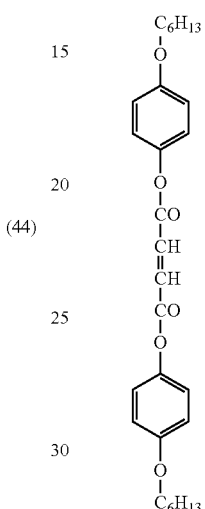

(43)

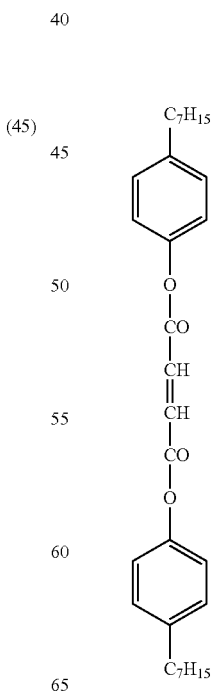

(44)

As previously mentioned, the rod-shaped compound preferably has a linear molecular structure. To this end, the trans type is preferred to the cis type.

The specific examples (2) and (3) each have optical isomers (four kinds of isomers in total) in addition to geometrical isomers. The trans type geometrical isomers are similarly preferred to the cis type geometrical isomers. There is nothing to choose among optical isomers. Any of D type optical isomer, L type optical isomer and racemate type optical isomer may be used.

In the specific examples (43) to (45), central vinylene bonds include trans type and cis type. For the same reason as mentioned above, the trans type vinylene bond is preferred to the cis type vinylene bond.

Other preferred examples of the rod-shaped compound will be given below.

-continued
(59)
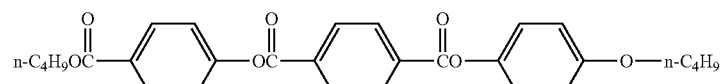
(60)
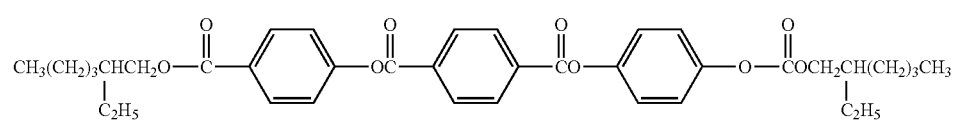
(61)
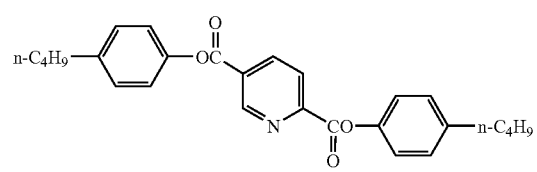
(62)
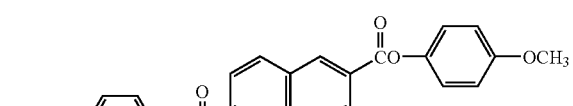
(63)
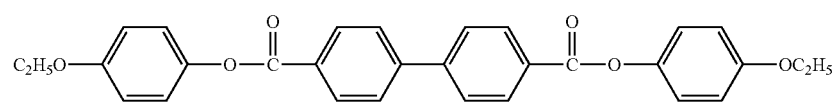
A-1
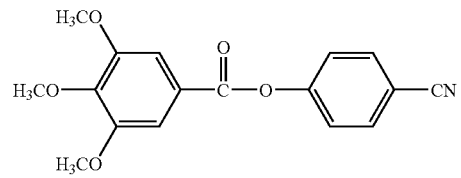
A-2
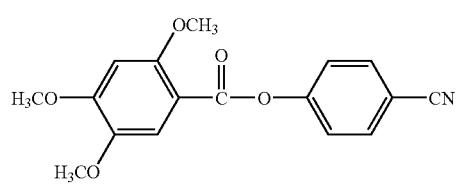
A-3
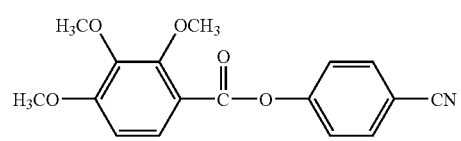
A-4
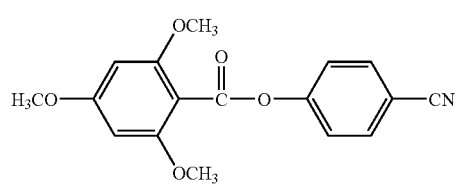
A-5
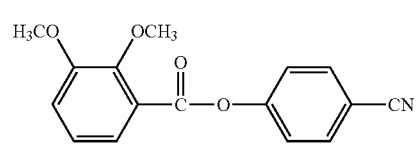
A-6
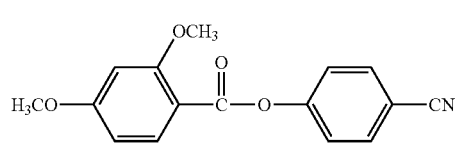
A-7
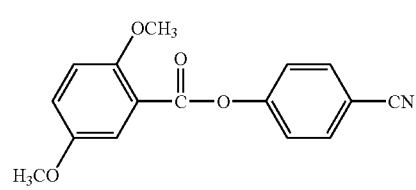
A-8
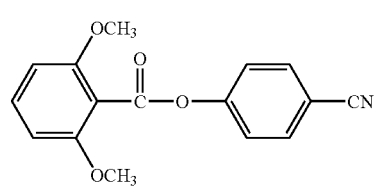
A-9
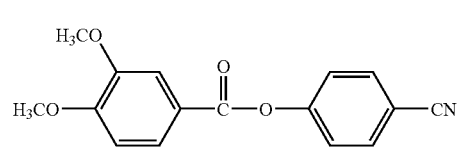
A-10
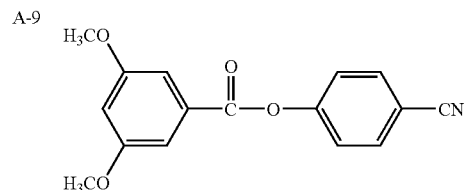
A-11
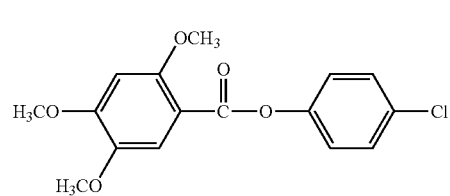
A-12
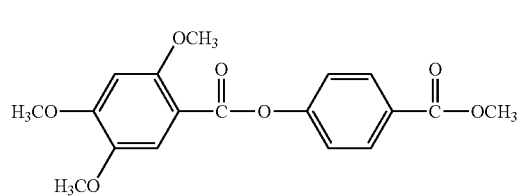

-continued
A-13
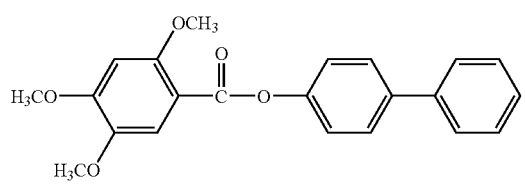
A-14
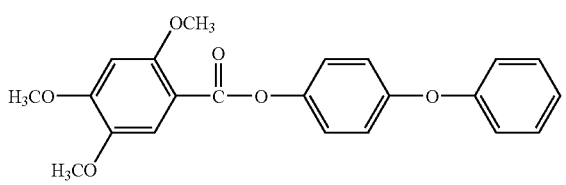
A-15
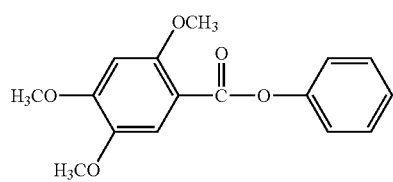
A-16
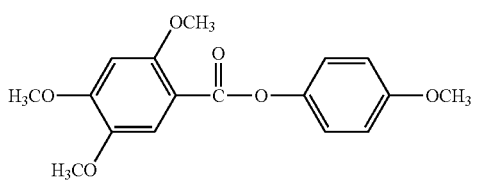
A-17
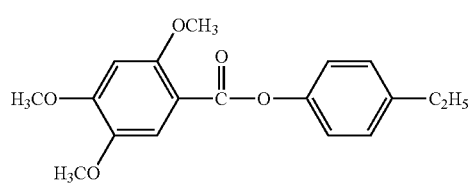
A-18
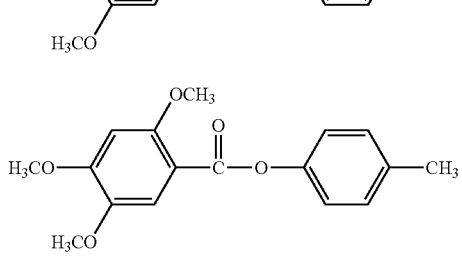
A-19
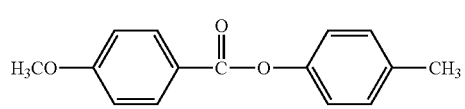
A-20
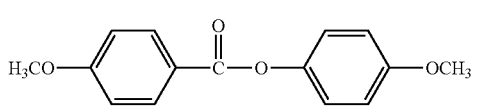
A-21
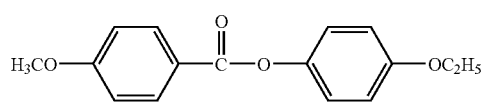
A-22
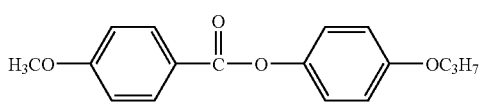
A-23
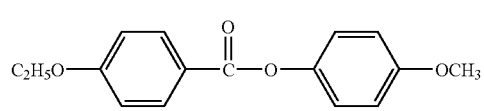
A-24
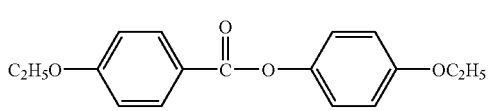
A-25
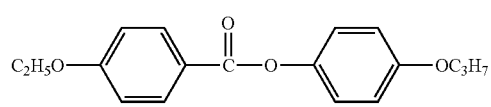
A-26
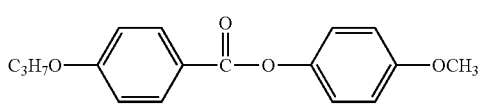
A-27
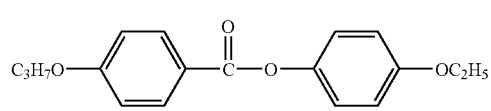
A-28
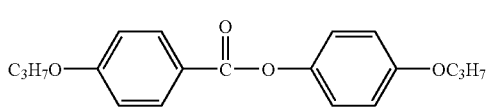
A-29
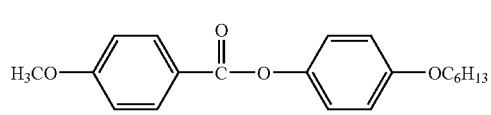
A-30
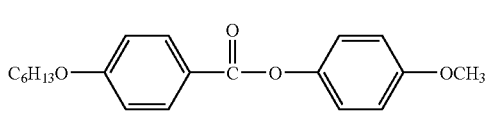
A-31
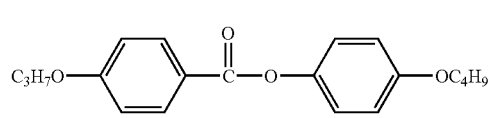
A-32
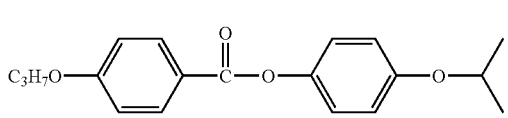
A-33
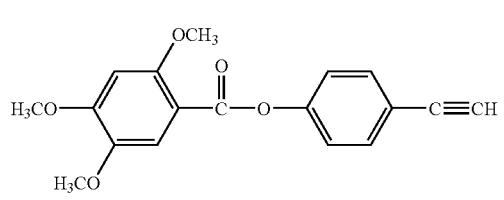
A-34
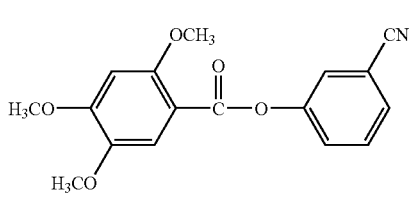

-continued

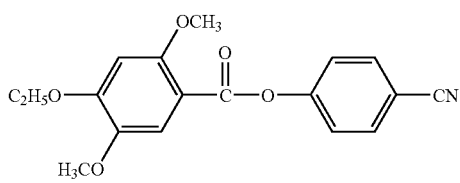
A-35

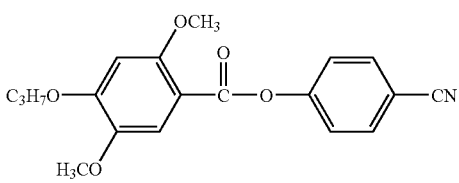
A-36

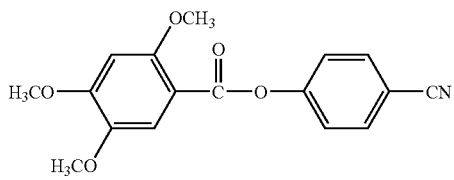
A-37

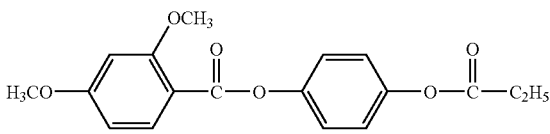
A-38

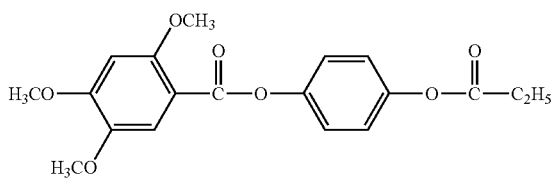
A-39

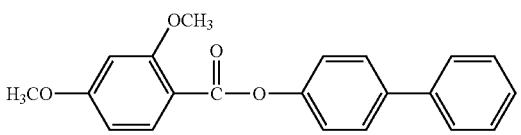
A-40

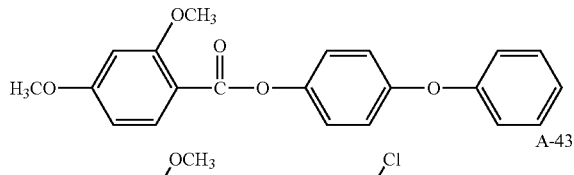
A-41

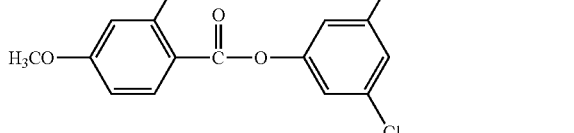
A-43

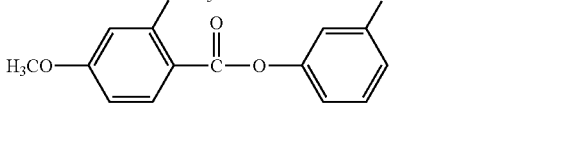
A-42

A-45

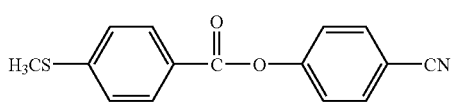
A-46

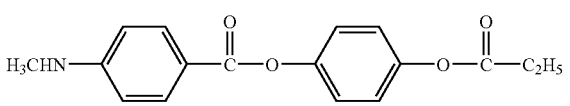
A-47

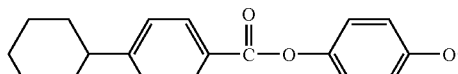
A-48

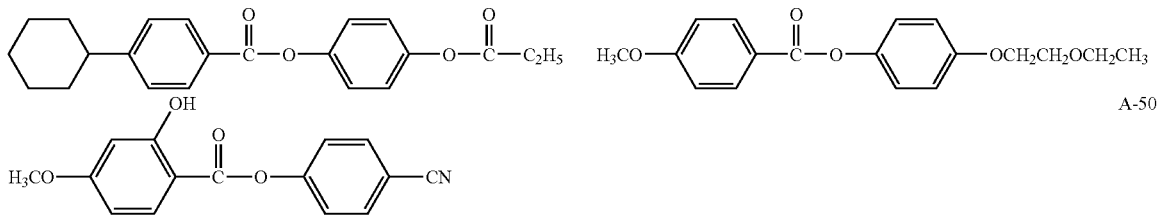
A-49

A-50

Two or more rod-shaped compounds having a maximum absorption wavelength (λmax) of shorter than 250 nm in the ultraviolet absorption spectrum of solution may be used in combination.

The rod-shaped compound can be synthesized by any method disclosed in literatures such as "Mol. Cryst. Liq. Cryst.", vol. 53, page 229, 1979, "Mol. Cryst. Liq. Cryst.", vol. 89, page 93, 1982, "Mol. Cryst. Liq. Cryst.", vol. 145, page 11, 1987, "Mol. Cryst. Liq. Cryst.", vol. 170, page 43, 1989, "J. Am. Chem. Soc.", vol. 113, page 1,349, 1991, "J. Am. Chem. Soc.", vol. 118, page 5,346, "J. Am. Chem. Soc.", vol. 92, page 1,582, 1970, "J. Org. Chem.", vol. 40, page 420, 1975, and "Tetrahedron", vol. 48, No. 16, page 3,437, 1992.

The aromatic compound is preferably used in an amount of from 0.01 to 20 parts by weight, more preferably from 1 to 20 parts by weight based on 100 parts by weight of cellulose acylate. Two or more aromatic compounds may be used in combination.

(Production of Cellulose Acylate Film)

For the production of the aforementioned cellulose acylate film, any ordinary method of preparing a cellulose acylate film may be used. In particular, a solvent casting method is preferably used. In the solvent casting method, a solution (dope) having a cellulose acylate dissolved in an organic solvent may be used to produce a film.

The preferred examples of the organic solvent employable herein include those selected from the group consisting of $C_3$-$C_{12}$ ethers, $C_3$-$C_{12}$ ketones, $C_3$-$C_{12}$ esters and $C_1$-$C_6$ halogenated hydrocarbons. These ethers, ketones and esters may have a cyclic structure. A compound having two or more of the functional groups of ether, ketone and ester (i.e., —O—, —CO— and —COO—) may be used as an organic solvent. The organic solvent may have other functional groups such as alcohol-based hydroxyl group. The number of carbon atoms in the organic solvent having two or more functional groups may fall within the range defined for compound having any of these functional groups.

Examples of the $C_3$-$C_{12}$ ethers include diisopropyl ether, dimethoxymethane, 1,4-dioxane, 1,3-dioxolane, tetrahydrofurane, anisole, and phenethol.

Examples of the $C_3$-$C_{12}$ ketones include acetone, methyl ethyl ketone, diethyl ketone, diisobutyl ketone, cyclohexanone, and methyl cyclohexanone.

Examples of the $C_3$-$C_{12}$ esters include methyl formate, propyl formate, pentyl formate, methyl acetate, ethyl acetate, and pentyl acetate.

Examples of the organic solvent having two or more functional groups include 2-ethoxyethyl acetate, 2-methoxyethanol, and 2-butoxyethanol.

The number of carbon atoms in the halogenated hydrocarbon is preferably from 1 or 2, most preferably 1. The halogen in the halogenated hydrocarbon is preferably chlorine. The proportion of hydrogen atoms in the halogenated hydrocarbon substituted by halogen is preferably from 25 to 75 mol-%, more preferably from 30 to 70 mol-%, even more preferably from 35 to 65 mol-%, most preferably from 40 to 60 mol-%. Methylene chloride is one of typical halogenated hydrocarbons.

Two or more organic solvents may be used in admixture.

The cellulose acylate solution may be prepared by any ordinary method. The term "ordinary method" as used herein is meant to indicate that the processing is effected at a temperature of not lower than 0° C. (ordinary temperature or high temperature). For the preparation of the solution, the method and apparatus of producing a dope in ordinary solvent casting method may be used. In the case of ordinary method, as an organic solvent there is preferably used a halogenated hydrocarbon (particularly methylene chloride).

The content of cellulose acylate is adjusted such that the cellulose acylate is incorporated in the resulting solution in an amount of from 10 to 40% by weight, preferably from 10 to 30% by weight. The organic solvent (main solvent) may comprise arbitrary additives described later incorporated therein.

The cellulose acylate solution can be prepared by stirring the cellulose acylate and the organic solvent at ordinary temperature (from 0 to 40° C.). A high concentration solution may be stirred under pressure and heating. In some detail, the cellulose acylate and the organic solvent are sealed in a pressure vessel. The mixture is then heated to a temperature of not lower than the boiling point of the solvent at ordinary temperature within the range in which the solvent doesn't boil under pressure with stirring. The heating temperature is normally 40° C. or more, preferably from 60 to 200° C., more preferably from 80 to 110° C.

The various components may be previously roughly mixed before being put in the vessel. Alternatively, these components may be sequentially put in the vessel. It is necessary that the vessel be formed so as to allow stirring. An inert gas such as nitrogen gas may be injected into the vessel to raise the pressure in the vessel. The rise of the vapor pressure of the solvent by heating may be utilized. Alternatively, the sealing of the vessel may be followed by the addition of the various components under pressure.

In the case where the components are heated, the vessel may be externally heated. For example, a jacket type heating device may be used. Alternatively, a plate heater may be provided outside the vessel so that the heated liquid is circulated through a piping provided on the vessel to heat the entire vessel.

The mixture is preferably stirred by an agitating blade provided inside the vessel. The agitating blade preferably has a length such that it reaches near the wall of the vessel. The agitating blade is preferably terminated by a scraper blade to renew the liquid layer on the wall of the vessel.

The vessel may have instruments such as pressure gauge and thermometer provided therein. The various components are dissolved in a solvent in the vessel. The dope thus prepared is cooled, and then withdrawn from the vessel. Alternatively, the dope thus prepared is withdrawn from the vessel, and then cooled by a heat exchanger or the like.

The solution may be prepared by a cold dissolution method. In the cold dissolution method, the cellulose acylate can be dissolved even in an organic solvent in which the cellulose acylate can be difficulty dissolved by ordinary dissolution methods. Even if a solvent in which the cellulose acylate can be dissolved by ordinary methods is used, the cold dissolution method can exert an effect of rapidly obtaining a uniform solution.

In the cold dissolution method, the cellulose acylate is gradually added to the organic solvent at room temperature with stirring. The content of the cellulose acylate is preferably adjusted such that the cellulose acylate is incorporated in the mixture in an amount of from 10 to 40% by weight, preferably from 10 to 30% by weight. The mixture may further comprise arbitrary additives described later incorporated therein.

Subsequently, the mixture is cooled to a temperature of from −100° C. to −10° C. (preferably from −80° C. to −10° C., more preferably from −50° C. to −20° C., most preferably from −50° C. to −30° C.). The cooling of the mixture may be effected in a dry ice-methanol bath (−75° C.) or a chilled diethylene glycol solution (−30° C. to −20° C.). In this manner, the mixture of cellulose acylate and organic solvent is solidified.

The cooling rate is preferably 4° C./min or more, more preferably 8° C./min or more, most preferably 12° C./min or more. The cooling rate is preferably as high as possible. However, the theoretical upper limit of the cooling rate is 10,000° C./sec. The technical upper limit of the cooling rate is 1,000° C./sec. The practical upper limit of the cooling rate is 100° C./sec. The cooling rate is obtained by dividing the difference between the temperature at which cooling begins and the final cooling temperature by the duration between the time at which cooling begins and the time at which the final cooling temperature is reached.

Further, when the mixture thus solidified is heated to a temperature of from 0° C. to 200° C. (preferably from 0° C. to 150° C., more preferably from 0° C. to 120° C., most preferably from 0° C. to 50° C.), the cellulose acylate is dissolved in the organic solvent. The temperature rise may be carried out by allowing the mixture to stand at room temperature or by heating the mixture over a hot bath. The heating rate is preferably 4° C./min or more, more preferably 8° C./min or more, most preferably 12° C./min or more. The heating rate is preferably as high as possible. The theoretical upper limit of the heating rate is 10,000° C./sec. The technical upper limit of the heating rate is 1,000° C./sec. The practical upper limit of the heating rate is 100° C./sec. The heating rate is obtained by dividing the difference between the temperature at which heating begins and the final heating temperature by the duration between the time at which heating begins and the time at which the final heating temperature is reached.

In this manner, a uniform solution is obtained. In the case where dissolution has been insufficiently made, cooling and heating may be repeated. Whether or not dissolution has been insufficiently made can be judged merely by visually observing the external appearance of the solution.

In the cold dissolution method, a sealable vessel is preferably used to avoid the entrance of water content due to moisture condensation. By effecting cooling step under pressure and heating step under reduced pressure, the dissolution time can be reduced. In order to raise and reduce the pressure, a pressure-resistant vessel is preferably used.

The 20 wt-% solution having a cellulose acylate (acetylation degree: 60.9%; viscosity-average polymerization degree: 299) dissolved in methyl acetate by a cold dissolution method shows a quasi-phase transition point between sol and gel at around 33° C. and becomes uniform gel at a temperature of not higher than 33° C. Accordingly, this solution needs to be stored at a temperature of not lower than the quasi-phase transition temperature, preferably a temperature of about 10° C. higher than the gel phase transition temperature. However, the quasi-phase transition temperature varies with the acylation degree and viscosity-average polymerization degree of cellulose acylate, the concentration of the solution or the organic solvent used.

The cellulose acylate solution (dope) thus prepared can be then subjected to solvent casting to produce a cellulose acylate film.

The dope thus prepared is casted over a drum or band so that the solvent is evaporated to form a film. The dope to be casted is preferably adjusted in its concentration such that the solid content is from 18 to 35% by weight. The surface of the drum or band is preferably previously mirror-like finished. For the details of casting and drying in the solvent casting method, reference can be made to U.S. Pat. Nos. 2,336,310, 2,367,603, 2,492,078, 2,492,977, 2,492,978, 2,607,704, 2,739,069, 2,739,070, British Patent 640,731, British Patent 736,892, JP-B-45-4554, JP-A-49-5614, JP-A-60-176834, JP-A-60-203430, and JP-A-62-115035.

The dope is preferably casted onto a drum or band having a surface temperature of 10° C. or less. The dope thus casted is preferably dried with an air wind for 2 or more seconds. The film thus obtained is peeled off the drum or band, and then optionally dried with a hot air wind having a successive temperature change from 100° C. to 160° C. so that the residual solvent is evaporated. For the details of this method, reference can be made to JP-B-5-17844. In this manner, the time between casting and peeling can be reduced. In order to execute this method, it is necessary that the dope undergo gelation at the surface temperature of the drum or band during casting.

The cellulose acylate film may comprise a plasticizer incorporated therein to enhance the mechanical properties or drying rate thereof. As such a plasticizer there may be used a phosphoric acid ester or carboxylic acid ester. Examples of the phosphoric acid ester include triphenyl phosphate (TPP), and tricresyl phosphate (TCP). Representative examples of the carboxylic acid ester include phthalic acid ester, and citric acid ester. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include triethyl O-acetylcitrate (OACTE), and tributyl O-acetylcitrate (OACTB). Other examples of carboxylic acid ester include butyl oleate, methylacetyl ricinoleate, dibutyl sebacate, and various trimellitic acid esters. A phthalic acid ester-based plasticizer (e.g., DMP, DEP, DBP, DOP, DPP, DEHP) is preferably used. DEP and DPP are particularly preferred.

The amount of the plasticizer to be incorporated is preferably from 0.1 to 25% by weight, more preferably from 1 to 20% by weight, most preferably from 3 to 15% by weight based on the amount of the cellulose acylate.

The cellulose acylate film may comprise a deterioration inhibitor (e.g., oxidation inhibitor, peroxide decomposer, radical inhibitor, metal inactivator, acid trapping agent, amine) incorporated therein. For the details of these deterioration inhibitors, reference can be made to JP-A-3-199201, JP-A-5-1907073, JP-A-5-194789, JP-A-5-271471, and JP-A-6-107854. In order to exert the effect of the deterioration inhibitor and inhibit the bleed out of the deterioration inhibitor to the surface of the film, the amount of the deterioration inhibitor to be incorporated is preferably from 0.01 to 1% by weight, more preferably from 0.01 to 0.2 parts by weight based on the amount of the solution (dope) to be prepared. Particularly preferred examples of the deterioration inhibitor include butyrated hydroxytoluene, and tribenzylamine (TBA).

(Stretching of Cellulose Acylate Film)

The cellulose acylate film may be stretched to adjust the retardation value thereof. The draw ratio is preferably from 3 to 100%.

As the stretching method there may be used any existing method without departing from the aforementioned scope of the invention. From the standpoint of in-plane uniformity, tenter stretching is particularly preferred. The cellulose acylate film of the invention preferably has a width of at least 100 cm. The dispersion of Re value over the total width is preferably ±5 nm, more preferably ±3 nm. The dispersion of Rth value over the total width is preferably ±10 nm, more preferably ±5 nm. The dispersion of Re value and Rth value over the length preferably fall within the range of crosswise dispersion.

The stretching may be effected in the course of filming step. Alternatively, the raw fabric of film wound may be subjected to stretching. In the former case, the film may be stretched while retaining residual solvent therein. When the content of residual solvent is from 2 to 30%, stretching can be fairly effected. During this procedure, the film is preferably stretched in the direction perpendicular to the longitudinal direction while being conveyed in the longitudinal direction so that the slow axis of the film is aligned perpendicular to the longitudinal direction of the film.

The stretching temperature conditions can be properly predetermined depending on the amount of residual solvent and the thickness of the film to be stretched. In the case where the film is stretched while retaining residual solvent, the film thus stretched is preferably dried. In order to dry the film thus stretched, the method described with reference to the preparation of film may be used.

The thickness of the cellulose acylate film thus stretched is 180 μm or less, preferably from 40 to 180 μm, more preferably from 60 to 110 μm, most preferably from 80 to 110 μm. The above defined range of thickness corresponds to the thickness of the optical compensation sheet.

(Surface Treatment of Cellulose Acylate Film)

In the case where the optical compensation sheet made of the aforementioned cellulose acylate film is used as a transparent protective film for polarizing plate, the cellulose acylate film is preferably subjected to surface treatment.

Examples of the surface treatment to be effected herein include corona discharge treatment, glow discharge treatment, flame treatment, acid treatment, alkaline treatment, and ultraviolet irradiation. Particularly preferred among these surface treatments is acid treatment or alkaline treatment, i.e., saponification of cellulose acylate.

The cellulose acylate film as mentioned above acts as an optical compensation sheet even when used only in a sheet.
(Polarizing Plate)

The polarizing plate comprises a polarizing film and two transparent protective films disposed on the respective side of the polarizing film. In the invention, as at least one of the two protective films there is used an optical compensation sheet of the aforementioned cellulose acylate film. The other protective film may be an ordinary cellulose acylate film.

Examples of the polarizing film include iodine-based polarizing film, dye-based polarizing film containing dichromatic dye, and polyester-based polarizing film. The iodine-based polarizing film and dye-based polarizing film are normally prepared from a polyvinyl alcohol-based film.

The slow axis of the optical compensation sheet and the transmission axis of the polarizing film are preferably aligned substantially parallel to each other.
(Anti-Reflection Layer)

The transparent protective film disposed on the side of the polarizing plate opposite the liquid crystal cell preferably has an anti-reflection layer provided thereon. In particular, in the invention, an anti-reflection layer (i) including a light-scattering layer and a lower refractive layer stacked on a transparent protective film in this order or an anti-reflection layer (ii) including a middle refractive layer, a higher refractive layer and a lower refractive layer stacked on a protective film in this order is preferably used. Preferred examples of such an anti-reflection layer will be given below.

A preferred example of the anti-reflection layer (i) including a light-scattering layer and a lower refractive layer provided on a protective film will be described below.

The light-scattering layer of the invention preferably has a particulate mat dispersed therein. The refractive index of the material of the light-scattering layer other than the particulate mat is preferably from 1.48 to 2.00. The refractive index of the lower refractive layer is preferably from 1.20 to 1.49. In the invention, the light-scattering layer has both anti-glare properties and hard coating properties. The light-scattering layer may be formed by a single layer or a plurality of layers such as two to four layers.

The anti-reflection layer is preferably designed in its surface roughness such that the central line average roughness Ra is from 0.08 to 0.40 µm, the ten point averaged roughness Rz is 10 times or less Ra, the average distance between mountain and valley Sm is from 1 to 100 µm, the standard deviation of the height of mountains from the deepest portion in roughness is 0.5 µm or less, the standard deviation of the average distance between mountain and valley Sm with central line as reference is 20 µm or less and the proportion of the surface having an inclination angle of from 0 to 5 degrees is 10% or less, making it possible to attain sufficient anti-glare properties and visually uniform matte finish. Further, when the tint of reflected light under C light source comprises a* value of −2 to 2 and b* value of −3 to 3 and the ratio of minimum reflectance to maximum reflectance at a wavelength of from 380 nm to 780 nm is from 0.5 to 0.99, the tint of reflected light is neutral to advantage. Moreover, when the b* value of transmitted light under C light source is predetermined to range from 0 to 3, the yellow tint of white display for use in display devices is reduced to advantage. Further, when a lattice of having a size of 120 µm×40 µm is disposed interposed between the planar light source and the anti-reflection film of the invention so that the standard deviation of brightness distribution measured over the film is 20 or less, glare developed when the film of the invention is applied to a high precision panel can be eliminated to advantage.

When the optical properties of the anti-reflection layer employable herein are such that the specular reflectance is 2.5% or less, the transmission is 90% or more and the 60° gloss is 70% or less, the reflection of external light can be inhibited, making it possible to enhance the viewability to advantage. In particular, the specular reflectance is more preferably 1% or less, most preferably 0.5% or less. When the haze is from 20% to 50%, the ratio of inner haze to total haze is from 0.3 to 1, the reduction of haze from that up to the light-scattering layer to that developed after the formation of the lower refractive layer is 15% or less, the sharpness of transmitted image at an optical comb width of 0.5 mm is from 20% to 50% and the ratio of transmission of vertical transmitted light to transmission of transmitted light in the direction of 2 degrees from the vertical direction is from 1.5 to 5.0, the prevention of glare on a high precision LCD panel and the elimination of blurring of letters, etc. can be attained to advantage.
(Lower Refractive Layer)

The refractive index of the lower refractive layer employable herein is preferably from 1.20 to 1.49, more preferably from 1.30 to 1.44. Further, the lower refractive layer preferably satisfies formula (6) to advantage from the standpoint of reduction of reflectance.

$$(m/4) \times 0.7 < n_1 d_1 < (m/4) \times 1.3 \quad (6)$$

wherein m represents a positive odd number; $n_1$ represents the refractive index of the lower refractive layer; and $d_1$ represents the thickness (nm) of the lower refractive layer.

The materials constituting the lower refractive layer will be described hereinafter.

The lower refractive layer preferably comprises a fluorine-containing polymer incorporated therein as a low refractive binder. As such a fluorine-based polymer there is preferably used a thermally or ionized radiation-crosslinkable fluorine-containing polymer having a dynamic friction coefficient of from 0.03 to 0.20, a contact angle of from 90 to 120° with respect to water and a purified water slip angle of 70° or less. As the peel force of the polarizing plate of the invention with respect to a commercially available adhesive tape during the mounting on the image display device decreases, the polarizing plate can be more easily peeled after the sticking of seal or memo to advantage. The peel force of the polarizing plate is preferably 500 gf or less, more preferably 300 gf or less, most preferably 100 gf or less as measured by a tensile testing machine. The higher the surface hardness as measured by a microhardness meter is, the more difficulty can be damaged the lower refractive layer. The surface hardness of the lower refractive layer is preferably 0.3 GPa or more, more preferably 0.5 GPa or more.

Examples of the fluorine-containing polymer to be used in the lower refractive layer include hydrolyzates and dehydration condensates of perfluoroalkyl group-containing silane compounds (e.g., (heptadecafluoro-1,1,2,2-tetrahydrodecyl) triethoxysilane). Other examples of the fluorine-containing polymer include fluorine-containing copolymers comprising a fluorine-containing monomer unit and a constituent unit for providing crosslinking reactivity as constituent components.

Specific examples of the fluorine-containing monomers include fluoroolefins (e.g., fluoroethylene, vinylidene fluoride, tetrafluoroethylene, perfluorooctylethylene, hexafluoropropylene, perfluoro-2,2-dimethyl-1,3-dioxol), partly or fully fluorinated alkylester derivatives of (meth)acrylic acid (e.g., Biscoat 6FM (produced by OSAKA ORGANIC CHEMICAL INDUSTRY LTD.), M-2020 (produced by DAIKIN INDUSTRIES, Ltd.), and fully or partly fluorinated vinyl ethers. Preferred among these fluorine-containing monomers are perfluoroolefins. Particularly preferred among these fluorine-containing monomers is hexafluoropropylene from the standpoint of refractive index, solubility, transparency, availability, etc.

Examples of the constituent unit for providing crosslinking reactivity include constituent units obtained by the polymerization of monomers previously having a self-crosslinking functional group such as glycidyl (meth)acrylate and glycidyl vinyl ether, constituent units obtained by the polymerization of monomers having carboxyl group, hydroxyl group, amino group, sulfo group or the like (e.g., (meth)acrylic acid, methyl (meth)acrylate, hydroxylalkyl (meth)acrylate, allyl acrylate, hydroxyethyl vinyl ether, hydroxybutyl vinyl ether, maleic acid, crotonic acid), and constituent units obtained by introducing a crosslinking reactive group such as (meth)acryloyl group into these constituent units by a polymer reaction (e.g., by reacting acrylic acid chloride with hydroxyl group).

Besides the aforementioned fluorine-containing monomer units and constituent units for providing crosslinking reactivity, monomers free of fluorine atom may be properly copolymerized from the standpoint of solubility in the solvent, transparency of the film, etc. The monomer units which can be used in combination with the aforementioned monomer units are not specifically limited. Examples of these monomer units include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinyl ether, vinyl toluene, α-methyl styrene), vinylethers (e.g., methyl vinyl ether, ethyl vinyl ether, cyclohexyl vinyl ether), vinylesters (e.g., vinyl acetate, vinyl propionate, vinyl cinnamate), acrylamides (e.g., N-tert-butyl acrylamide, N-cyclohexyl acrylamide), methacrylamides, and acrylonitrile derivatives.

The aforementioned polymers may be used properly in combination with a hardener as disclosed in JP-A-10-25388 and JP-A-10-147739.

(Light-Scattering Layer)

The light-scattering layer is formed for the purpose of providing the film with light-scattering properties developed by any of surface scattering and inner scattering and hard coating properties for the enhancement of scratch resistance of the film. Accordingly, the light-scattering layer comprises a binder for providing hard coating properties, a particulate mat for providing light diffusibility and optionally an inorganic filler for the enhancement of refractive index, the prevention of crosslink shrinkage and the enhancement of strength incorporated therein.

The thickness of the light-scattering layer is from 1 to 10 μm, more preferably from 1.2 to 6 μm for the purpose of providing hard coating properties. When the thickness of the light-scattering layer falls with this range, the resulting light-scattering layer has a sufficient hardness. The resulting polarizing plate has no problems with curling resistance and brittleness and hence a good adaptability to working.

The binder to be incorporated in the light-scattering layer is preferably a polymer having a saturated hydrocarbon chain or polyether chain as a main chain, more preferably a polymer having a saturated hydrocarbon chain as a main chain. The binder polymer preferably has a crosslinked structure. As the binder polymer having a saturated hydrocarbon chain as a main chain there is preferably used a polymer of ethylenically unsaturated monomers. As the binder polymer having a saturated hydrocarbon chain as a main chain and a crosslinked structure there is preferably used a (co)polymer of monomers having two or more ethylenically unsaturated groups. In order to provide the binder polymer with a higher refractive index, those containing an aromatic ring or at least one atom selected from the group consisting of halogen atoms other than fluorine, sulfur atom, phosphorus atom and nitrogen atom may be selected.

Examples of the monomer having two or more ethylenically unsaturated groups include esters of polyvalent alcohol with (meth)acrylic acid (e.g., ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylol ethane tri (meth)acrylate, dipentaerythritol penta (meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), modification products of the aforementioned ethylene oxides, vinylbenzene and derivatives thereof (e.g., 1,4-divinylbenzene, 4-vinyl benzoic acid-2-acryloylethylester, 1,4-divinyl cyclohexanone), vinylsulfones (e.g., divinylsulfone), acrylamides (e.g., methylenebisacrylamide), and methacrylamides. The aforementioned monomers may be used in combination of two or more thereof.

Specific examples of the higher refractive monomer include bis(4-methacryloylthiophenyl)sulfide, vinyl naphthalene, vinyl phenyl sulfide, and 4-methacryloxy phenyl-4'-methoxyphenylthioether. These monomers, too, may be used in combination of two or more thereof.

The polymerization of the monomers having these ethylenically unsaturated groups can be effected by irradiation with ionized radiation or heating in the presence of a photoradical polymerization initiator or heat-radical polymerization initiator. Accordingly, a lower refractive layer can be formed by a process which comprises preparing a coating solution containing a monomer having an ethylenically unsaturated group, a photo-polymerization initiator or heat radical polymerization initiator, a particulate mat and an inorganic filler, spreading the coating solution over a transparent support, and then irradiating the coat with ionized radiation or applying heat to the coat to cause polymerization reaction and curing. As such a photo-polymerization initiator or the like there may be used any compound known as such.

As the polymer having a polyether as a main chain there is preferably used an open-ring polymerization product of polyfunctional epoxy compound. The open-ring polymerization of the polyfunctional epoxy compound can be carried out by the irradiation of the polyfunctional epoxy compound with ionized radiation or applying heat to the polyfunctional epoxy compound in the presence of a photo-acid generator or heat-acid generator. Accordingly, a lower refractive layer can be formed by a process which comprises preparing a coating solution containing a polyfunctional epoxy compound, a photo-acid generator or heat-acid generator, a particulate mat and an inorganic filler, spreading the coating solution over the transparent support, and then irradiating the coat layer with ionized radiation or applying heat to the coat layer to cause polymerization reaction and curing. As such an acid-generator or the like there may be used a material known as such.

Instead of or in addition to the monomer having two or more ethylenically unsaturated groups, a monomer having a crosslinkable functional group may be used to incorporate a crosslinkable functional group in the polymer so that the crosslinkable functional group is reacted to incorporate a crosslinked structure in the binder polymer.

Examples of the crosslinkable functional group include isocyanate group, epoxy group, aziridin group, oxazoline group, aldehyde group, carbonyl group, hydrazine group, carboxyl group, methylol group, and active methylene group. Vinylsulfonic acids, acid anhydries, cyanoacrylate derivatives, melamines, etherified methylol, esters, urethane, and metal alkoxides such as tetramethoxysilane, too, may be used as monomers for introducing crosslinked structure. Functional groups which exhibit crosslinkability as a result of decomposition reaction such as block isocyanate group may be used. In other words, in the invention, the crosslinkable functional group may not be reactive as they are but may become reactive as a result of decomposition reaction. These binder polymers having a crosslinkable functional group may be spread and heated to form a crosslinked structure.

The light-scattering layer comprises a particulate mat incorporated therein having an average particle diameter which is greater than that of filler particles and ranges from 1 to 10 µm, preferably from 1.5 to 7.0 µm, such as inorganic particulate compound and particulate resin for the purpose of providing itself with anti-glare properties.

Specific examples of the aforementioned particulate mat include inorganic particulate compounds such as particulate silica and particulate $TiO_2$, and particulate resins such as particulate acryl, particulate crosslinked acryl, particulate polystyrene, particulate crosslinked styrene, particulate melamine resin and particulate benzoguanamine resin. Preferred among these particulate resins are particulate crosslinked styrene, particulate crosslinked acryl, particulate crosslinked acryl styrene, and particulate silica.

The particulate mat may be either spherical or amorphous.

Two or more particulate mats having different particle diameters may be used in combination. A particulate mat having a greater particle diameter may be used to provide the light-scattering layer with anti-glare properties. A particulate mat having a greater particle diameter may be used to provide the light-scattering layer with other optical properties.

Further, the distribution of the particle diameter of the mat particles is most preferably monodisperse. The particle diameter of the various particles are preferably as close to each other as possible. For example, in the case where a particle having a diameter of 20% or more greater than the average particle diameter is defined as coarse particle, the proportion of these coarse particles is preferably 1% or less, more preferably 0.1% or less, even more preferably 0.01% or less of the total number of particles. A particulate mat having a particle diameter distribution falling within the above defined range can be obtained by properly classifying the mat particles obtained by an ordinary synthesis method. By raising the number of classifying steps or intensifying the degree of classification, a matting agent having a better distribution can be obtained.

The aforementioned particulate mat is incorporated in the light-scattering layer in such a manner that the proportion of the particulate mat in the light-scattering layer is from 10 to 1,000 mg/m$^2$, more preferably from 100 to 700 mg/m$^2$.

For the measurement of the distribution of particle size of mat particles, a coulter counter method. The particle size distribution thus measured is then converted to distribution of number of particles.

The light-scattering layer preferably comprises an inorganic filler made of an oxide of at least one metal selected from the group consisting of titanium, zirconium, aluminum, indium, zinc, tin and antimony having an average particle diameter of 0.2 µm or less, preferably 0.1 µm or less, more preferably 0.06 µm or less incorporated therein in addition to the aforementioned particulate mat to enhance the refractive index thereof.

In order to enhance the difference of refractive index from the particulate mat, the light-scattering layer comprising a high refractive particulate mat incorporated therein preferably comprises a silicon oxide incorporated therein for keeping the refractive index thereof somewhat low. The preferred particle diameter of the particulate silicon oxide is the same as that of the aforementioned inorganic filler.

Specific examples of the inorganic filler to be incorporated in the light-scattering layer include $TiO_2$, $ZrO_2$, $Al_2O_3$, $In_2O_3$, $ZnO$, $SnO_2$, $Sb_2O_3$, ITO, and $SiO_2$. Particularly preferred among these inorganic fillers are $TiO_2$ and $ZrO_2$ from the standpoint of enhancement of refractive index. The inorganic filler is preferably subjected to silane coupling treatment or titanium coupling treatment on the surface thereof. To this end, a surface treatment having a functional group reactive with the binder seed on the surface thereof is preferably used.

The amount of the inorganic filler to be incorporated is preferably from 10 to 90%, more preferably from 20 to 80%, particularly from 30 to 75% based on the total weight of the light-scattering layer.

Such a filler has a particle diameter which is sufficiently smaller than the wavelength of light and thus causes no scattering. Thus, a dispersion having such a filler dispersed in a binder polymer behaves as an optically uniform material.

The bulk refractive index of the mixture of binder and inorganic filler in the light-scattering layer is preferably from 1.48 to 2.00, more preferably from 1.50 to 1.80. In order to predetermine the bulk refractive index of the mixture within the above defined range, the kind and proportion of the binder and the inorganic filler may be properly selected. How to select these factors can be previously easily known experimentally.

In order to keep the light-scattering layer uniform in surface conditions such as uniformity in coating and drying and prevention of point defects, the coating solution for forming the light-scattering layer comprises either or both of fluorine-based surface active agent and silicone-based surface active agent incorporated therein. In particular, a fluorine-based surface active agent is preferably used because it can be used in a smaller amount to exert an effect of eliminating surface defects such as unevenness in coating and drying and point defects of the anti-reflection film of the invention. Such a fluorine-based surface active agent is intended to render the coating solution adaptable to high speed coating while enhancing the uniformity in surface conditions, thereby raising the productivity.

The anti-reflection layer (ii) including a middle refractive layer, a higher refractive layer and a lower refractive layer stacked on a protective film in this order will be described hereinafter.

The anti-reflection layer including a layer structure having at least a middle refractive layer, a higher refractive layer and a lower refractive layer (outermost layer) stacked on a protective film in this order is designed so as to have a refractive index satisfying the following relationship.

Refractive index of higher refractive layer>refractive index of middle refractive layer>refractive index of protective film>refractive index of lower refractive layer Further, a hard coat layer may be provided interposed between the protective film and the middle refractive layer. Moreover, the anti-reflection layer may include a middle refractive layer, a hard coat layer, a higher refractive layer and a lower refractive layer laminated on each other. For example, an anti-reflection layer as disclosed in JP-A-8-122504, JP-A-8-110401, JP-A-10-300902, JP-A-2002-243906, and JP-A-2000-111706 may be used. Further, the various layers may be provided with other functions. Examples of these layers include stain-proof lower refractive layer, and antistatic higher refractive layer (as disclosed in JP-A-10-206603, JP-A-2002-243906).

The haze of the anti-reflection layer is preferably 5% or less, more preferably 3% or less. The strength of the anti-reflection layer is preferably not lower than H, more preferably not lower than 2H, most preferably not lower than 3H as determined by pencil hardness test method according to JIS K5400.

(Higher Refractive Layer and Middle Refractive Layer)

The layer having a high refractive index in the anti-reflection layer is formed by a hardened layer containing at least a higher refractive inorganic particulate compound having an average particle diameter of 100 nm or less and a matrix binder.

As the higher refractive inorganic particulate compound there may be used an inorganic compound having a refractive index of 1.65 or more, preferably 1.9 or more. Examples of such a higher refractive inorganic particulate compound include oxides of Ti, Zn, Sb, Sn, Zr, Ce, Ta, La and In, and composite oxides of these metal atoms.

In order to provide such a particulate material, the following requirements need to be satisfied. For example, the surface of the particles must be treated with a surface treatment (e.g., silane coupling agent as disclosed in JP-A-11-295503, JP-A-11-153703, and JP-A-2000-9908, anionic compound or organic metal coupling agent as disclosed in JP-A-2001-310432). Further, the particles must have a core-shell structure comprising a high refractive particle as a core (as disclosed in JP-A-2001-166104). A specific dispersant must be used at the same time (as disclosed in JP-A-11-153703, U.S. Pat. No. 6,210,858B1, JP-A-2002-2776069).

Examples of the matrix-forming materials include known thermoplastic resins, thermosetting resins, etc.

Preferred examples of the matrix-forming materials include polyfunctional compound-containing compositions having two or more of at least any of radically polymerizable group and/or cationically polymerizable group, compositions having an organic metal compound containing a hydrolyzable group, and at least one selected from the group consisting of compositions containing a partial condensate thereof. Examples of these materials include compounds as disclosed in JP-A-2000-47004, JP-A-2001-315242, JP-A-2001-31871, and JP-A-2001-296401.

Further, a colloidal metal oxide obtained from a hydrolytic condensate of metal alkoxide and a curable layer obtained from a metal alkoxide composition are preferably used. For the details of these materials, reference can be made to JP-A-2001-293818.

The refractive index of the higher refractive layer is preferably from 1.70 to 2.20. The thickness of the higher refractive layer is preferably from 5 nm to 10 μm, more preferably from 10 nm to 1 μm.

The refractive index of the middle refractive layer is adjusted so as to fall between the refractive index of the lower refractive layer and the higher refractive layer. The refractive index of the middle refractive layer is preferably from 1.50 to 1.70. The thickness of the middle refractive layer is preferably from 5 nm to 10 μm, more preferably from 10 nm to 1 μm.

(Lower Refractive Layer)

The lower refractive layer is stacked on the higher refractive layer. The refractive index of the lower refractive layer is preferably from 1.20 to 1.55, more preferably from 1.30 to 1.50. The lower refractive layer is preferably designed as an outermost layer having scratch resistance and stain resistance. In order to drastically raise the scratch resistance of the lower refractive layer, a thin layer which can effectively provide surface slipperiness may be formed on the lower refractive layer by introducing a known silicone or fluorine thereinto.

The refractive index of the fluorine-containing compound is preferably from 1.35 to 1.50, more preferably from 1.36 to 1.47. As the fluorine-containing compound there is preferably used a compound containing a crosslinkable or polymerizable functional group having fluorine atoms in an amount of from 35 to 80% by weight. Examples of such a compound include those disclosed in JP-A-9-222503, paragraphs (0018)-(0026), JP-A-11-38202, paragraphs (0019)-(0030), JP-A-2001-40284, paragraphs (0027)-(0028), and JP-A-284102.

As the silicone compound there is preferably used a compound having a polysiloxane structure wherein a curable functional group or polymerizable functional group is incorporated in the polymer chain to form a bridged structure in the film. Examples of such a compound include reactive silicones (e.g., SILAPLANE, produced by CHISSO CORPORATION), and polysiloxanes having silanol group at both ends thereof (as disclosed in JP-A-11-258403).

In order to effect the crosslinking or polymerization reaction of at least any of fluorine-containing polymer and siloxane polymer having crosslinkable or polymerizable group, the coating composition for forming the outermost layer containing a polymerization initiator, a sensitizer, etc. is preferably irradiated with light or heated at the same time with or after spreading to form a lower refractive layer. As the polymerization initiator, sensitizer, etc. there may be used any materials known as such.

Further, a sol-gel cured film obtained by curing an organic metal compound such as silane coupling agent and a silane coupling agent containing a specific fluorine-containing hydrocarbon group in the presence of a catalyst is preferably used. Examples of such a sol-gel cured film include polyfluoroalkyl group-containing silane compounds and partial hydrolytic condensates thereof (compounds as disclosed in JP-A-58-142958, JP-A-58-14783, JP-A-58-147484, JP-A-9-157582, and JP-A-11-106704), and silyl compounds having poly(perfluoroalkylether) group as a fluorine-containing long chain (compounds as disclosed in JP-A-2000-117902, JP-A-2001-48590, JP-A-2002-53804).

The lower refractive layer may include a filler (e.g., low refractive inorganic compound having a primary average particle diameter of from 1 to 150 nm such as particulate silicon dioxide (silica) and particulate fluorine-containing material (magnesium fluoride, calcium fluoride, barium fluoride), organic particulate material as disclosed in JP-A-11-3820, paragraphs (0020)-(0038)), a silane coupling agent, a lubricant, a surface active agent, etc. incorporated therein as additives other than the aforementioned additives. In the case where the lower refractive layer is disposed under the outermost layer, the lower refractive layer may be formed by a gas phase method (vacuum metallizing method, sputtering method, ion plating method, plasma CVD method, etc.). A coating method is desirable because the lower refractive layer can be produced at reduced cost. The thickness of the lower refractive layer is preferably from 30 to 200 nm, more preferably from 50 to 150 nm, most preferably from 60 to 120 nm.

(Layers Other than Anti-Reflection Layer)

Further, a hard coat layer, a forward scattering layer, a primer layer, an antistatic layer, an undercoating layer, a protective film, etc. may be provided.

(Hard Coat Layer)

The hard coat layer is provided on the surface of the protective film to give a physical strength to the protective film having an anti-reflection layer provided thereon. In particular, the hard coat layer is preferably provided interposed between the transparent support and the aforementioned higher refractive layer.

The hard coat layer is preferably formed by the crosslinking reaction or polymerization reaction of a photosetting and/or thermosetting compound. The curable functional group in the curable compound is preferably a photopolymerizable functional group. Further, an organic metal compound or organic alkoxysilyl compound containing a hydrolyzable functional group is desirable. Specific examples of these compounds include the same compounds as exemplified with reference to the higher refractive layer. Specific examples of the composition constituting the hard coat layer include those described in JP-A-2002-144913, JP-A-2000-9908, and WO00/46617.

The higher refractive layer may act also as a hard coat layer. In this case, particles may be finely dispersed in a hard coat layer in the same manner as described with reference to the higher refractive layer to form a higher refractive layer.

The hard coat layer may comprise particles having an average particle diameter of from 0.2 to 10 µm incorporated therein to act also as an anti-glare layer provided with anti-glare properties. The provision of the anti-glare properties can be carried out by any known method.

(0206)

The thickness of the hard coat layer may be properly designed depending on the purpose. The thickness of the hard coat layer is preferably from 0.2 to 10 µm, more preferably from 0.5 to 7 µm.

The strength of the hard coat layer is preferably not lower than H, more preferably not lower than 2H, most preferably not lower than 3H as determined by pencil hardness test according to JIS K5400. The abrasion of the test specimen is preferably as little as possible when subjected to taper test according to JIS K5400.

(Antistatic Layer)

The antistatic layer, if provided, is preferably given an electrical conductivity of $10^{-8}$ ($\Omega cm^{-3}$) or less as calculated in terms of volume resistivity. The use of a hygroscopic material, a water-soluble inorganic salt, a certain kind of a surface active agent, a cation polymer, an anion polymer, colloidal silica, etc. makes it possible to provide a volume resistivity of $10^{-8}$ ($\Omega cm^{-3}$). However, these materials have a great dependence on temperature and humidity and thus cannot provide a sufficient electrical conductivity at low humidity. Therefore, as the electrically conductive layer material there is preferably used a metal oxide. Some metal oxides have a color. The use of such a colored metal oxide as an electrically conductive layer material causes the entire film to be colored to disadvantage.

Examples of metal that forms a colorless metal oxide include Zn, Ti, Al, In, Si, Mg, Ba, Mo, W, and V. Metal oxides mainly composed of these metals are preferably used. Specific examples of these metal oxides include $ZnO$, $TiO_2$, $SnO_2$, $Al_2O_3$, $In_2O_3$, $SiO_2$, $MgO$, $BaO$, $MoO_3$, $V_2O_5$, and composites thereof. Particularly preferred among these metal oxides are $ZnO$, $TiO_2$, and $SnO_2$. Referring to the incorporation of different kinds of atoms, Al, In, etc. are effectively added to $ZnO$. Sb, Nb, halogen atoms, etc. are effectively added to $SnO_2$. Nb, Ta, etc. are effectively added to $TiO_2$. Further, as disclosed in JP-B-59-6235, materials comprising the aforementioned metal oxide attached to other crystalline metal particles or fibrous materials (e.g., titanium oxide) may be used.

Volume resistivity and surface resistivity are different physical values and thus cannot be simply compared with each other. However, in order to provide an electrical conductivity of $10^{-8}$ ($\Omega cm^{-3}$) or less as calculated in terms of volume resistivity, it suffices if the electrically conductive layer has an electrical conductivity of approximately $10^{-10}$ ($\Omega/\square$) or less, preferably $10^{-8}$ ($\Omega/\square$) or less as calculated in terms of surface resistivity. It is necessary that the surface resistivity of the electrically conductive layer be measured when the antistatic layer is provided as an outermost layer. In the invention, the measurement of surface resistivity can be effected at a step in the course of the formation of laminated film.

(Liquid Crystal Display Device)

The polarizing plate including an optical compensation sheet of the aforementioned cellulose acylate film and an anti-reflection layer can be used in liquid crystal display devices, particularly transmission type liquid crystal display devices to advantage.

A transmission type liquid crystal display device includes a liquid crystal cell and two polarizing plates disposed on the respective side of the liquid crystal cell. The liquid crystal cell includes a liquid crystal supported interposed between two electrode substrates.

In an exemplary embodiment of the transmission type liquid crystal display device of the invention, the optical compensation sheet of the invention is disposed interposed between the liquid crystal cell and one or both of the polarizing plates.

In another embodiment of implementation of the transmission type liquid crystal display device of the invention, as the transparent protective film to be disposed between the liquid crystal cell and the polarizing film there is used an optical compensation sheet of the aforementioned cellulose acylate film. The optical compensation sheet of the cellulose acylate film and the polarizing film are preferably aligned such that the slow axis of the optical compensation sheet and the transmission axis of the polarizing film are oriented substantially parallel to each other. The aforementioned optical compensation sheet may be used only as the transparent protective film for one of the polarizing plates (disposed between the liquid crystal cell and the polarizing film). Alternatively, the aforementioned optical compensation sheet may be used as the transparent protective film for both the two polarizing plates (disposed between the liquid crystal cell and the polarizing film).

The liquid crystal cell is preferably of VA mode.

In a VA mode liquid crystal cell, rod-shaped liquid crystal molecules are vertically oriented when no voltage is applied.

VA mode liquid crystal cells include (1) liquid crystal cell in VA mode in a narrow sense in which rod-shaped liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multi-domained to expand the viewing angle (MVA mode) (as disclosed in SID97, Digest of Tech. Papers (preprint) 28 (1997), 845), (3) liquid crystal cell of mode in which rod-shaped molecules are oriented substantially vertically when no voltage is applied but oriented in twisted multidomained mode when a voltage is applied (n-ASM mode, CAP mode) (as disclosed in Preprints of Symposium on Japanese Liquid Crystal Society Nos. 58 to 59, 1988 and (4) liquid crystal cell of SURVALVAL mode (as reported in LCD International 98).

EXAMPLES

The invention will further be illustrated below with reference to the following Examples which in no way limit the scope of the invention.

Example 1

1. Film Formation of Cellulose Acylate Film
(1) Preparation of Cellulose Acylate Various types of cellulose acylates having acyl groups differing in types and substitution degrees from one another as shown in Table 1 were prepared. Sulfuric acid (7.8 parts by weight on the basis of 100 parts by weight of cellulose) was added as a catalyst and, then, a carboxylic acid which became a raw material of an acyl substituent was added and, subsequently, an acylation reaction was performed at 40° C. On this occasion, a type and a substitution degree of the acyl group was adjusted by adjusting a type and an amount of the carboxylic acid. Further, after acylation was performed, ripening was performed at 40° C. Further, a component, having a low molecular weight, of the resultant cellulose acylate was removed by being rinsed with acetone. Still further, in Table 1, CAB denotes cellulose acetate butyrate (cellulose ester derivative in which an acyl group is formed by an acetate group and a butylyl group) in short; CAP denotes cellulose acetate propionate (cellulose ester derivative in which an acyl group is formed by an acetate group and a propionyl group) in short; and CTA denotes cellulose triacetate (cellulose ester derivative in which an acyl group is formed only by acetate groups).

(2) Dissolution

As shown in Table 1, a cellulose acylate, a plasticizer and a retardation adjustor were added to a mixed solvent (dicyclomethane/methanol:87/13 parts by weight) while stirring and allowed to be dissolved therein. On this occasion, 1 part by weight, based on 100 parts by weight of cellulose acylate, of "Sumisorb 165F" (plasticizer; produced by Sumitomo Chemical Co., Ltd.) was simultaneously added with stirring and heating. When an ultraviolet ray absorbing agent was used, 0.375 part by weight of an ultraviolet ray absorbing agent B ("TINUVIN 327" produced by Ciba Specialty Chemicals) and/or 0.75 part by weight of an ultraviolet ray absorbing agent C ("TINUVIN 328" produced by Ciba Specialty Chemicals) was added.

The resultant dope (cellulose acetate composition) was flow-cast by using a band flow-casting machine. Namely, the dope was transversally stretched while having an amount of residual solvent and at a temperature as shown in Table 1 by using a tenter with a draw ratio as shown in Table 1, to thereby prepare various types of cellulose acylate films F1 to F12. On the thus-prepared various types of cellulose acylate films (optical compensatory sheets9, an Re retardation value and an Rth retardation value were measured at 633 nm by using an ellipsometer ("M-150" manufactured by JASCO). In the cellulose acylate film according to the invention, an Re/Rth variation per 1% of a draw ratio was in the range of 0.01 to 0.016. In an cellulose acylate film of Comparative Example, that was 0.001.

Elastic moduli of these films at 25° C. was in the range of 150 kgf/mm$^2$ to 300 kgf/mm$^2$; hazes were all in the range of 0.1 to 0.9; secondary average particle diameters of matt agents were 1.0 μm or less; weight changes thereof after left to stand for 48 hours at 80° C. 90% RH were 0 to 3%; and size changes thereof after left to stand for 24 hours at 60° C. 95% RH and 90° C. 5% RH were 0 to 4.5%. Further, in each sample, a photoelastic coefficient was $50 \times 10^{-13}$ cm$^2$/dyne or less.

TABLE 1

| | | Cellulose acylate | | | | |
|---|---|---|---|---|---|---|
| | | | Ac group Degree of | Bu/Pr group | | Total degree of substitution | DS6/ |
| | Execution No. | Kind of cotton | substitution | Kind | Substitution | (DS2 + DS3 + DS6) | (DS2 + DS3 + DS6) |
| Inventive | F1 | CAB | 0.9 | Bu | 1.8 | 2.7 | 0.3 |
| Inventive | F2 | CAB | 0.9 | Bu | 1.8 | 2.7 | 0.3 |
| Inventive | F3 | CAP | 1.9 | Pr | 0.8 | 2.7 | 0.31 |
| Inventive | F4 | CAP | 1.9 | Pr | 0.8 | 2.7 | 0.31 |
| Inventive | F5 | CTA | 2.87 | — | — | 2.87 | 0.3 |
| Inventive | F6 | CTA | 2.87 | — | — | 2.87 | 0.3 |
| Inventive | F7 | CTA | 2.87 | — | — | 2.87 | 0.3 |
| Inventive | F8 | CTA | 2.80 | — | — | 2.80 | 0.32 |
| Inventive | F9 | CTA | 2.80 | — | — | 2.80 | 0.32 |
| Comparative | F10 | CAB | 0.9 | Bu | 1.8 | 2.7 | 0.3 |
| Comparative | F11 | CAP | 1.9 | Pr | 0.8 | 2.7 | 0.31 |
| Comparative | F12 | CTA | 2.87 | — | 0 | 2.87 | 0.3 |

| | Plasticizer TPP/BDP | Retardation adjustor Kind | Amount | Content (%) of residual solvent | Stretching temperature (° C.) | Draw ratio (%) | Dry thickness (μm) | Retardation value Re (nm) | Rth (nm) |
|---|---|---|---|---|---|---|---|---|---|
| Inventive | 5.8 | Compound 1 | 6 | 30 | 130 | 15 | 80 | 32 | 140 |
| Inventive | 11.7 | Compound 2 Compound 3 | 4.5 4.5 | 30 | 130 | 25 | 92 | 40 | 130 |
| Inventive | 11.7 | Compound 1 | 6 | 30 | 130 | 18 | 80 | 45 | 148 |
| Inventive | 11.7 | Compound 2 Compound 3 | 4.5 4.5 | 30 | 130 | 25 | 92 | 50 | 130 |

TABLE 1-continued

| | | | | | | | | | |
|---|---|---|---|---|---|---|---|---|---|
| Inventive | 11.7 | Compound 1 | 3 | 25 | 140 | 32 | 92 | 32 | 135 |
| Inventive | 11.7 | Compound 2 | 3.5 | 25 | 140 | 25 | 92 | 40 | 140 |
| | | Compound 3 | 3.5 | | | | | | |
| Inventive | 11.7 | Compound 1 | 3 | 25 | 140 | 32 | 108 | 50 | 250 |
| Inventive | 11.7 | Compound 1 | 5.1 | 25 | 145 | 32 | 93 | 65 | 230 |
| Inventive | 11.7 | Compound 1 | 3.4 | 25 | 145 | 32 | 93 | 70 | 220 |
| | | Compound 3 | 2.6 | | | | | | |
| Comparative | 5.8 | None | — | 30 | 130 | 0 | 80 | 2 | 29 |
| Comparative | 11.7 | None | — | 30 | 130 | 0 | 80 | 3 | 32 |
| Comparative | 11.7 | None | — | 25 | 140 | 0 | 92 | 5 | 52 |

Retardation adjustor 1 (Compound 1)

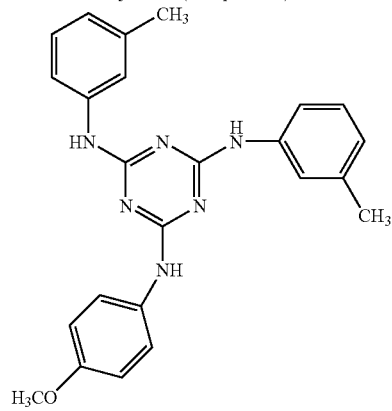

Retardation adjustor 2 (Compound 2)

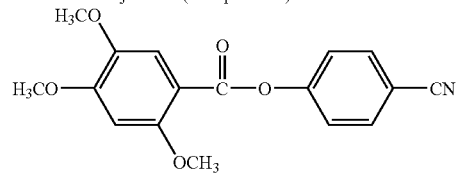

Retardation adjustor 3 (Compound 3)

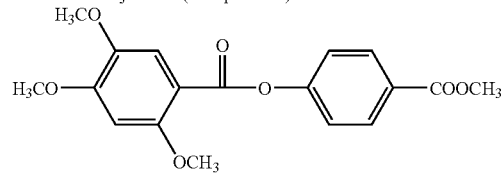

2. Preparation of Polarizing Plate
(Polarizing Plate—Example 1)

A PVA film having an average polymerization degree of 2400 and a film thickness of 75 μm was subjected to a preliminary swelling for 48 seconds at 15° C. by using ion-exchanged water and, after water on a surface was scraped out by using a blade made of stainless steel, was dipped (while conducting a concentration adjustment to allow the concentration to be consistent) in an aqueous solution (dyeing solution) added, while conducting a concentration adjustment to allow the concentration to be consistent, with 0.9 g/L of iodine and 60.0 g/L of potassium iodide for 55 seconds at 40° C. and, further dipped, while conducting a concentration adjustment to allow the concentration to be consistent, in an aqueous solution (film hardening solution) added with 42.5 g/L of boric acid and 30 g/L of potassium iodide for 90 seconds at 40° C. and was, then, stretched (while conducting a concentration adjustment to allow the concentration to be consistent) by 6.3 times therein. A film thickness of the polarizing plate on this occasion was 29 μm. After an edge portion thereof was cut by 3 cm in a width direction by using a cutter, the resultant film was stacked with Fujitac (cellulose triacetate; retardation value in a plane: 3.0 nm; film thickness: 80 μm) manufactured by Fuji Photo Film Co., Ltd. subjected to a saponification treatment by using an aqueous 3% by weight solution of PVA (PVA-124H; manufactured by Kuraray Co., Ltd.) as an adhesive and, then, the resultant layered product was heated for 10 minutes at 75° C., to thereby prepare 100 m long of a polarizing plate having an effective width of 650 mm in rolled form. The thus-prepared polarizing plate (plate 1) is shown in Table 2.

(Polarizing Plate—Example 2)

A PVA film having a number average polymerization degree of 2400 and a film thickness of 50 μm was subjected to a preliminary swelling for 60 seconds at 15° C. by using water and, after excess water was removed, was dipped (while conducting a concentration adjustment to allow the concentration to be consistent) in an aqueous solution (dyeing solution) added, while conducting a concentration adjustment to allow the concentration to be consistent, with 1.0 g/L of iodine and 60.0 g/L of potassium iodide for 65 seconds at 40° C. and, then, stretched (while conducting a concentration adjustment to allow the concentration to be consistent) by 6.3 times in an aqueous solution (film hardening solution) added, while conducting a concentration adjustment to allow the concentration to be consistent, with 42.5 g/L of boric acid, 30 g/L of potassium iodide, 0.1 g/L of C. I. Direct Yellow 44 ($\lambda_{max}$410 nm) and 0.1 g/L of C. I. Direct Blue 1 ($\lambda_{max}$650 nm). A film thickness of the polarizing plate on this occasion was 29 μm. After an edge portion thereof was cut by 5 cm in a width direction by using a cutter, one face of the resultant film was stacked with a cellulose acylate film subjected to a saponification treatment as shown in Table 1 and the other face thereof was stacked with Fujitac (cellulose triacetate; retardation value in a plane: 3.0 nm; film thickness: 80 μm) manufactured by Fuji Photo Film Co., Ltd. subjected to a saponification treatment by using an aqueous 3% by weight solution of PVA (PVA-124H; manufactured by Kuraray Co., Ltd.) as an adhesive and, then, the resultant layered product was heated for 10 minutes at 75° C., to thereby prepare 500 m long of a polarizing plate having an effective width of 1340 mm. The thus-prepared polarizing plate (plate 2) is shown in Table 2.

(Polarizing Plate—Example 3)

A PVA film having a number average polymerization degree of 2400 and a film thickness of 75 μm was subjected to a preliminary swelling for 60 seconds at 15° C. by using water and, after excess water was removed, was dipped (while conducting a concentration adjustment to allow the concentration to be consistent) in an aqueous solution (dyeing solution) added, while conducting a concentration adjustment to allow the concentration to be consistent, with 1.0 g/L of iodine and 60.0 g/L of potassium iodide for 65 seconds at 40° C. and, then, stretched (while conducting a concentration adjustment to allow the concentration to be consistent) by 6.3 times in an aqueous solution (film hardening solution) added, while conducting a concentration adjustment to allow the concentration to be consistent, with 55.0 g/L of boric acid and 10 g/L of potassium iodide. A film thickness of the polarizing plate on this occasion was 29 μm. After an edge portion thereof was cut by 5 cm in a width direction by using a cutter, one face of the resultant film was stacked with a cellulose acylate film subjected to a saponification treatment as shown in Table 1 and the other face thereof was stacked with Fujitac (cellulose triacetate; retardation value in a plane: 3.0 nm; film thickness: 80 μm) manufactured by Fuji Photo Film Co., Ltd. subjected to a saponification treatment by using an aqueous 3% by weight solution of PVA (PVA-124H; manufactured by Kuraray Co., Ltd.) as an adhesive and, then, the resultant layered product was heated for 20 minutes at 50° C., to thereby prepare 500 m long of a polarizing plate having an effective width of 1340 mm. The thus-prepared polarizing plate (plate 3) is shown in Table 2.

The saponification was conducted under the following conditions:

A 1.5 mol/L aqueous solution of sodium hydroxide was prepared and heated at 55° C. Next, a 0.01 mol/L aqueous solution of dilute sulfuric acid was prepared and heated at 35° C. The prepared cellulose acylate film was dipped in the aqueous solution of sodium hydroxide for 2 minutes and, then, dipped in water to fully wash out the aqueous solution of sodium hydroxide. After being dipped in the above-described aqueous solution of dilute sulfuric acid for one minute, the film was dipped in water to fully wash out the aqueous solution of dilute sulfuric acid. Lastly, the film (sample) was fully dried at 120° C.

3. Performance Evaluation of Polarizing Plate (1) Single-Plate Transmittance and Polarization Degree In regard to the thus-prepared polarizing plate, a polarizing degree was measured by using a Shimadzu self-recording spectrophotometer "UV3100" (manufactured by Shimadzu Corporation).

The polarization degree was determined by the following formula supposing that the transmittance of two polarizing plates at the time the two polarizing plates are stacked on each other such that absorption axes of the two polarizing plates correspond with each other is H0 and the transmission of two polarizing plates at the time the two polarizing plates are stacked on each other such that absorption axes of the two polarizing plates are perpendicular to each other is H1. The single-plate transmittance and the polarization degree were subjected to a luminosity correction:

polarization degree $P=((H0-H1)/(H0+H1))^{1/2} \times 100$.

It is necessary that the polarizing degree P determined based on the above formula of the polarizing plate according to the invention is 99.9% or more.

(2) Transmittance of Cross Nicol Configuration

Transmittance (%) at the time two polarizing plates are stacked on each other such that absorption axes thereof are allowed to correspond with each other was measured by using a Shimadzu self-recording spectrophotometer "UV3100" (manufactured by Shimadzu Corporation) and, then, transmittance at each of 700 nm and 410 nm was determined.

(3) Hue

Hue x, y in a CIE color space at the time of the cross nicol configuration was measured by using a Shimadzu self-recording spectrophotometer "UV3100" (manufactured by Shimadzu Corporation).

4. Attachment to VA Pane

A pair of polarizing plates and a pair of optical compensatory sheets which were provided in a liquid crystal display device (manufactured by Fujitsu Ltd.) using a vertically aligned liquid crystal cell were removed and, then, the liquid crystal cell was taken out. In place of the thus-removed pair of polarizing plates and pair of optical compensatory sheets which were provided in the liquid crystal display device using the vertically aligned liquid crystal cell, the previously-prepared polarizing plates P1 to P12, P19 to P24 and P26 to P34 (shown in Table 2) were each independently stuck one each on a backlight side and a viewing side of the liquid crystal cell via an adhesive such that the previously-prepared cellulose acylate film came to be on the liquid crystal cell side. The polarizing plates P13 to P18 and P25 were each independently stuck on the backlight side of the liquid crystal cell via the adhesive such that the previously-prepared cellulose acylate film came to be on the liquid crystal cell side. On the viewing side, one sheet of a commercially available polarizing plate (HLC 2-5618HCS; manufactured by Sanritz Corporation) was stuck.

The polarizing plates were thus provided in a cross nicol configuration such that the transmission axis of the polarizing plate on the viewing side was vertically aligned, while the transmission axis of the polarizing plate on the backlight side was horizontally aligned.

As a result of observing the thus-prepared liquid crystal display device, a neutral black display was realized both in a frontal direction and a viewing angle direction. Further, a viewing angle (contrast ratio: 10 or more, within the range of no reversal of tones on the black side) was measured at each of eight tones of from a black display (L1) to a white display (L8) by using a measuring apparatus (EZ-Contrast 160D; manufactured by ELDIM S.A., France).

A wide viewing angle was realized by providing the polarizing plate according to the invention. Further, results thus obtained, as well as those of visual observation of the hue at the time of the black display are shown in Table 2.

TABLE 2

| | Execution No. | Cellulose acylate prepared | Polarizing plate | Polarization degree | Transmittance at 700 nm | Transmittance at 400 nm | CIE hue X | CIE hue Y | Viewing angle | Tint of color at black display |
|---|---|---|---|---|---|---|---|---|---|---|
| Inventive | P1 | F1 | Plate 2 | 99.97% | 0.05% | 0.02% | 0.30 | 0.30 | >80° >80° | Favorable |
| Inventive | P2 | F1 | Plate 3 | 99.96% | 0.07% | 0.05% | 0.29 | 0.28 | >80° >80° | Favorable |
| Inventive | P3 | F2 | Plate 2 | 99.97% | 0.05% | 0.02% | 0.30 | 0.30 | >80° >80° | Favorable |
| Inventive | P4 | F2 | Plate 3 | 99.96% | 0.07% | 0.05% | 0.29 | 0.28 | >80° >80° | Favorable |
| Inventive | P5 | F3 | Plate 2 | 99.97% | 0.05% | 0.02% | 0.30 | 0.30 | >80° >80° | Favorable |
| Inventive | P6 | F3 | Plate 3 | 99.96% | 0.07% | 0.05% | 0.29 | 0.28 | >80° >80° | Favorable |
| Inventive | P7 | F4 | Plate 2 | 99.97% | 0.05% | 0.02% | 0.30 | 0.30 | >80° >80° | Favorable |
| Inventive | P8 | F4 | Plate 3 | 99.96% | 0.07% | 0.05% | 0.29 | 0.28 | >80° >80° | Favorable |
| Inventive | P9 | F5 | Plate 2 | 99.97% | 0.05% | 0.02% | 0.30 | 0.30 | >80° >80° | Favorable |
| Inventive | P10 | F5 | Plate 3 | 99.96% | 0.07% | 0.05% | 0.29 | 0.28 | >80° >80° | Favorable |
| Inventive | P11 | F6 | Plate 2 | 99.97% | 0.05% | 0.02% | 0.30 | 0.30 | >80° >80° | Favorable |
| Inventive | P12 | F6 | Plate 3 | 99.96% | 0.07% | 0.05% | 0.29 | 0.28 | >80° >80° | Favorable |
| Inventive | P13 | F7 | Plate 2 | 99.97% | 0.05% | 0.02% | 0.30 | 0.30 | >80° >80° | Favorable |
| Inventive | P14 | F7 | Plate 3 | 99.96% | 0.07% | 0.05% | 0.29 | 0.28 | >80° >80° | Favorable |
| Inventive | P15 | F8 | Plate 2 | 99.97% | 0.05% | 0.02% | 0.30 | 0.30 | >80° >80° | Favorable |
| Inventive | P16 | F8 | Plate 3 | 99.96% | 0.07% | 0.05% | 0.29 | 0.28 | >80° >80° | Favorable |
| Inventive | P17 | F9 | Plate 2 | 99.97% | 0.05% | 0.02% | 0.30 | 0.30 | >80° >80° | Favorable |
| Inventive | P18 | F9 | Plate 3 | 99.96% | 0.07% | 0.05% | 0.29 | 0.28 | >80° >80° | Favorable |
| Comparative | P19 | F1 | Plate 1 | 99.96% | 0.15% | 0.10% | 0.23 | 0.24 | >80° >80° | Bluish |
| Comparative | P20 | F2 | Plate 1 | 99.96% | 0.15% | 0.10% | 0.23 | 0.24 | >80° >80° | Bluish |
| Comparative | P21 | F3 | Plate 1 | 99.96% | 0.15% | 0.10% | 0.23 | 0.24 | >80° >80° | Bluish |
| Comparative | P22 | F4 | Plate 1 | 99.96% | 0.15% | 0.10% | 0.23 | 0.24 | >80° >80° | Bluish |
| Comparative | P23 | F5 | Plate 1 | 99.96% | 0.15% | 0.10% | 0.23 | 0.24 | >80° >80° | Bluish |
| Comparative | P24 | F6 | Plate 1 | 99.96% | 0.15% | 0.10% | 0.23 | 0.24 | >80° >80° | Bluish |
| Comparative | P25 | F7 | Plate 1 | 99.96% | 0.15% | 0.10% | 0.23 | 0.24 | >80° >80° | Bluish |
| Comparative | P26 | F10 | Plate 2 | 99.97% | 0.05% | 0.02% | 0.30 | 0.30 | 75° 70° | Favorable |
| Comparative | P27 | F10 | Plate 3 | 99.96% | 0.07% | 0.05% | 0.29 | 0.28 | 75° 70° | Favorable |
| Comparative | P28 | F10 | Plate 1 | 99.96% | 0.15% | 0.10% | 0.23 | 0.24 | 75° 70° | Bluish |
| Comparative | P29 | F11 | Plate 2 | 99.97% | 0.05% | 0.02% | 0.30 | 0.30 | 75° 70° | Favorable |
| Comparative | P30 | F11 | Plate 3 | 99.96% | 0.07% | 0.05% | 0.29 | 0.28 | 75° 70° | Favorable |
| Comparative | P31 | F11 | Plate 1 | 99.96% | 0.15% | 0.10% | 0.23 | 0.24 | 75° 70° | Bluish |
| Comparative | P32 | F12 | Plate 2 | 99.97% | 0.05% | 0.02% | 0.30 | 0.30 | 75° 70° | Favorable |
| Comparative | P33 | F12 | Plate 3 | 99.96% | 0.07% | 0.05% | 0.29 | 0.28 | 75° 70° | Favorable |
| Comparative | P34 | F12 | Plate 1 | 99.96% | 0.15% | 0.10% | 0.23 | 0.24 | 75° 70° | Bluish |

It is found that the polarizing plate according to the invention is excellent in optical compensatory characteristics, small in changes of polarizing performance over time and excellent in moisture and heat resistance. Further, it is also found that a VA mode liquid crystal display device having a wide viewing angle and a favorable hue can be provided by using the polarizing plate according to the invention.

Example 2

1. Preparation of Polarizing Plate 02 Having Anti-Reflection Layer
(Preparation of Coating Solution of Light Scattering Layer)

50 g of a mixture of pentaerythritol triacrylate and pentaerythritol tetraacrylate (PETA; manufactured by Nippon Kayaku Co., Ltd.) was diluted by using 38.5 g of toluene and, then, added with 2 g of a polymerization initiator (IRGACURE®184; manufactured by Ciba Specialty Chemicals) and, subsequently, mixed with stirring. The resultant solution was applied and cured by an ultraviolet ray to form a film. A refractive index of the thus-formed film was 1.51.

Further, the solution was added with 1.7 g of a 30% by weight toluene dispersion of cross-linked polystyrene particles (SX-350; refractive index: 1.60; manufactured by Soken Chemical & Engineering Co., Ltd.), having an average particle diameter of 3.5 µm, which has been subjected to a Polytron dispersing device for 20 minutes at 10000 rpm and 13.3 g of a 30% by weight toluene dispersion of cross-linked acrylic-styrene particles (refractive index: 1.55; manufactured by Soken Chemical & Engineering Co., Ltd.) having an average particle diameter of 3.5 µm and, lastly, with 0.75 g of a fluorine type surface modifier (FP-1) as described below and 10 g of a silane coupling agent (KBM-5103; manufactured by Shin-Etsu Chemical Co., Ltd.), to thereby prepare a finish solution.

The resultant mixed solution was filtered by using a filter made of polypropylene having a pore diameter of 30 µm, to thereby prepare a coating solution for a light scattering layer.

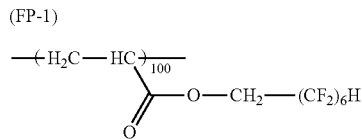

(FP-1)

(Preparation of Coating Solution for Lower Refractive Layer)

13 g of a thermocurable fluorine-containing polymer having a refractive index of 1.42 (JN-7228; solid content: 6%; manufactured by JSR Corporation), 1.3 g of silica sol (Silica, different particle size version of MEK-ST; average particle diameter: 45 nm; solid content concentration: 30%; manufactured by Nissan Chemical Industries, Ltd.), 0.6 g of a sol solution a, 5 g of methyl ethyl ketone and 0.6 g of cyclohexane were mixed and, then, stirred and, thereafter, filtered by using a filter made of polypropylene having a pore diameter of 1 µm, to thereby prepare a coating solution for a lower refractive layer.

(Preparation of Transparent Protective Film Having Anti-Reflection Layer)

A triacetyl cellulose film having a thickness of 80 µm (TAC-TD80U; manufactured by Fuji Photo Film Co., Ltd.) was unwound in roll form and, then, the coating solution for the functional layer (light scattering layer) prepared above was applied on the thus-unwound triacetyl cellulose film using a microgravure roll having a diameter of 50 mm and a gravure pattern of 180 lines/inch and a depth of 40 µm and a doctor blade at a gravure roll rotation of 30 rpm and a transfer rate of 30 m/minute and, then, dried for 150 seconds at 60° C. Thereafter, an ultraviolet ray was irradiated on the resultant article at an illuminance of 400 mW/cm$^2$ and a dose of 300 mJ/cm$^2$ using an air cooled metal halide lamp of 160 W/cm (manufactured by Eye Graphics Co., Ltd.) while conducting a purge by using a nitrogen gas to cure the coating layer and form a functional layer having a thickness of 6 µm. Then, the thus-formed functional layer was wound.

The triacetyl cellulose film coated with the functional layer (light scattering layer) was again unwound and, then, the coating solution for the lower refractive layer prepared above was applied on the thus-unwound triacetyl cellulose film using a microgravure roll having a diameter of 50 mm and a gravure pattern of 180 lines/inch and a depth of 40 µm and a doctor blade at a gravure roll rotation of 30 rpm and a transfer rate of 15 m/minute and, then, dried for 150 seconds at 120° C. Thereafter, an ultraviolet ray was irradiated on the resultant article at an illuminance of 400 mW/cm$^2$ and a dose of 900 mJ/cm$^2$ using an air cooled metal halide lamp of 240 W/cm (manufactured by Eye Graphics Co., Ltd.) while conducting a purge by using a nitrogen gas, to thereby form a lower refractive layer having a thickness of 100 nm. Then, the thus-formed lower refractive layer was wound.

(Preparation of Polarizing Plate 02)

A polarizing film was prepared in a same manner as in the polarizing plate 1 of Example 1.

The thus-prepared transparent protective film 01 having the anti-reflection layer was subjected to the saponification treatment in a same manner as in Example 1 and was stuck to one side of the polarizing film by using a polyvinyl alcohol type adhesive. Further, the cellulose acylate film F1 prepared in Example 1 was subjected to the saponification treatment in a same manner as in Example 1 and stuck to an opposite side of the polarizing film by using the polyvinyl alcohol type adhesive.

The transmission axis of the polarizing film and the slow axis of the cellulose acylate film F1 prepared in Example 1 were arranged such that they are parallel to each other. In another case, the transmission axis of the polarizing film and the slow axis of the commercially available cellulose triacetate film were arranged such that they are orthogonal to each other. In such manner as described above, the polarizing plate 02 was prepared.

An integrating sphere average reflectance was used for the mirror reflectance. A spectral reflection factor was measured by using a spectrophotometer (manufactured by JASCO Corporation) at an incidence angle of 5° in the wavelength range of 380 to 780 nm. When the integrating sphere average reflectance in the wavelength range of 450 to 650 nm was sought, it was found to be 2.3%.

2. Preparation of Polarizing Plate 03 Having an Anti-Reflection Layer (Preparation of Coating Solution for Hard Coat Layer)

750.0 parts by weight of trimethylol propane triacrylate (TMPTA, manufactured by Nippon Kayaku Co., Ltd.) was added with 270.0 parts by weight of poly(glycidyl methacrylate) having a weight average molecular weight of 3000, 730.0 g of methyl ethyl ketone, 500.0 g of cyclohexanone and 50.0 g of a photopolymerization initiator (IRGACURE®184; manufactured by Nippon Ciba-Geigy K.K.) and, then, stirred. The resultant mixture was filtered by using a filter made of polypropylene having a pore diameter of 0.4 µm, to thereby prepare a coating solution for a hard coat layer.

(Preparation of Titanium Dioxide Fine Particle Dispersion)

Titanium dioxide fine particles (MPT-129; manufactured by Ishihara Sangyo Kaisha, Ltd.), containing cobalt, which has been subjected to a surface treatment by using aluminum hydroxide and zirconium hydroxide was used. 257.1 g of the particles was added with 38.6 g of a dispersing agent to be described below and 704.3 g of cyclohexanone and, then, dispersed by using a Dinomill, to thereby prepare a titanium dioxide dispersion having a weight average diameter of 70 nm.

(Preparation of Coating Solution for Middle Refractive Layer)

88.9 g of the above-prepared titanium dioxide dispersion was added with 58.4 g of a mixture of dipentaerythritol pentaacrylate and dipentaerythritol hexacrylate (DPHA; Nippon Kayaku Co., Ltd.), 3.1 g of a photopolymerization initiator (IRGACURE®907; manufactured by Nippon Ciba-Geigy K.K.), 1.1 g of a photosensitizer (Kayacure-DETX; manufactured by Nippon Kayaku Co., Ltd.), 482.4 g of methyl ethyl ketone and 1869.8 g of cyclohexanone and, then, stirred. After fully stirred, the resultant mixture was filtered by using a filter made of polypropylene having a pore diameter of 0.4 µm, to prepare a coating solution of a middle refractive layer.

(Preparation of Coating Solution for Higher Refractive Layer)

586.8 g of the above-prepared titanium dioxide dispersion was added with 47.9 g of a mixture of dipentaerythritol pentaacrylate and dipentaerythritol hexacrylate (DPHA; manufactured by Nippon Kayaku Co., Ltd.), 4.0 g of a photopolymerization initiator IRGACURE®907; manufactured by Nippon Ciba-Geigy K.K.), 1.3 g of a photosensitizer (Kayacure-DETX; manufactured by Nippon Kayaku Co., Ltd.), 455.8 g of methyl ethyl ketone and 1427.8 g of cyclohexanone and, then, stirred. After fully stirred, the resultant mixture was filtered by using a filter made of polypropylene having a pore diameter of 0.4 µm, to prepare a coating solution of a higher refractive layer.

(Preparation of Coating Solution for Lower Refractive Layer)

Perfluoroolefin copolymer (1) to be described below was dissolved in methyl ethyl ketone to be in a 7% by weight concentration and, then, added with 3% by weight, based on the solid content, of a silicone resin having a terminal methacrylate group (X-22-164C; manufactured by Shin-Etsu Chemical Co., Ltd.) and 5% by weight, based on the solid content, of a photo-radical generating agent (IRGACURE® 907 (trade name); manufactured by Nippon Ciba-Geigy K.K.), to prepare a coating solution for a lower refractive layer.

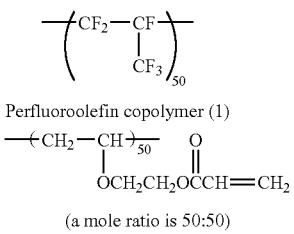

Perfluoroolefin copolymer (1)

$$-\!\!\!\!+\!CH_2-CH\!+\!\!\!\!-_{50}$$
$$\quad\quad\quad\; |$$
$$\quad\quad OCH_2CH_2OCCH\!\!=\!\!CH_2$$
$$\quad\quad\quad\quad\quad\;\; \|$$
$$\quad\quad\quad\quad\quad\;\; O$$

(a mole ratio is 50:50)

(Preparation of Transparent Protective Film 02 Having Anti-Reflection Layer)

The coating solution for the hard coat layer was applied on the triacetyl cellulose film having a thickness of 80 μm (TD-80UF; manufactured by Fuji Photo Film Co., Ltd.) by using a gravure coater and, then, dried at 100° C. Thereafter, an ultraviolet ray was irradiated on the resultant article at an illuminance of 400 mW/cm$^2$ and a dose of 300 mJ/cm$^2$ using an air cooled metal halide lamp of 160 W/cm (manufactured by Eye Graphics Co., Ltd.) while conducting a purge by using a nitrogen gas such that an atmosphere of an oxygen concentration of 1.0% by volume or less is generated to cure the coating layer and form a hard coat layer having a thickness of 8 μm. Then, the coating solution for the middle refractive layer, the coating solution for the higher refractive layer and the coating solution for the lower refractive layer were continuously applied on the thus-formed hard coat layer by using a gravure coater having three application stations.

Drying conditions of the middle refractive layer were set to be a temperature of 100° C. and a period of 2 minutes and ultraviolet ray irradiation conditions were set to be that, while conducting a purge by using a nitrogen gas such that an atmosphere of an oxygen concentration of 1.0% by volume or less is generated, irradiation was performed by using an air cooled metal halide lamp of 180 W/cm (manufactured by Eye Graphics Co., Ltd.) with an illuminance of 400 mW/cm$^2$ and a dose of 400 mJ/cm$^2$. The refractive index and the thickness of the middle refractive layer after cured were 1.630 and 67 nm, respectively.

Drying conditions of the higher refractive layer and the lower refractive layer were each set to be a temperature of 90° C. and a period of 1 minute and, then, 100° C. and a period of 1 minute and ultraviolet ray irradiation conditions were set to be that, while conducting a purge by using a nitrogen gas such that an atmosphere of an oxygen concentration of 1.0% by volume or less is generated, irradiation was performed by using an air cooled metal halide lamp of 240 W/cm (manufactured by Eye Graphics Co., Ltd.) with an illuminance of 600 mW/cm$^2$ and a dose of 600 mJ/cm$^2$. The refractive index and the thickness of the higher refractive layer after cured were 1.905 and 107 nm, respectively, while the refractive index and the thickness of the lower refractive layer after cured were 1.440 and 85 nm, respectively. In such manner as described above, the transparent protective film having the anti-reflection layer was prepared.

(Preparation of Polarizing Plate 03)

A polarizing plate 03 was prepared in a same manner as in the polarizing plate 02 except that the transparent protective film 02 having the anti-reflection layer was used in place of the transparent protective film 01 having the anti-reflection layer.

The integrating sphere average reflectance was used for the mirror reflectance. A spectral reflection factor was measured by using a spectrophotometer (manufactured by JASCO Corporation) at an incidence angle of 5° in the wavelength range of 380 to 780 nm. When the integrating sphere average reflectance in the wavelength range of 450 to 650 nm was sought, it was found to be 0.4%.

3. Attachment to VA Panel

In a same manner as in Example 1, a pair of polarizing plates and a pair of optical compensatory sheets which were provided in a liquid crystal display device (manufactured by Fujitsu, Ltd.) using a vertically aligned liquid crystal cell were removed and, then, the liquid crystal cell was taken out.

The thus-prepared polarizing plate 02 was stuck on the viewing side of the liquid crystal cell via an adhesive such that the previously-prepared transparent protective film 1 having the anti-reflection layer came to be on the opposite side of the liquid crystal cell. On the backlight side, the polarizing plate P1 prepared in Example 1 was stuck such that the previously-prepared cellulose acylate film F1 came to be on the liquid crystal cell side. The polarizing plates were thus provided in a crossed Nicols arrangement such that the transmission axis of the polarizing plate on the viewing side was vertically aligned, while the transmission axis of the polarizing plate on the backlight side was horizontally aligned.

The polarizing plate 03 was similarly stuck, to thereby prepare a liquid crystal display device. As a result of observing the thus-prepared liquid crystal display device, a neutral black display was realized both in a frontal direction and a viewing angle direction. Further, a frontal contrast was also favorable.

It is found that the polarizing plate according to the invention is excellent in optical compensatory characteristics, small in changes of polarizing performance over time and excellent in moisture and heat resistance. Further, it is also found that a VA mode liquid crystal display device having a wide viewing angle and a favorable hue can be provided by using the polarizing plate according to the invention.

INDUSTRIAL APPLICABILITY

An polarizing plate according to the invention can be used to a liquid crystal display device having a wide viewing angle a favorable hue.

It will be apparent to those skilled in the art that various modifications and variations can be made to the described preferred embodiments of the invention without departing from the spirit or scope of the invention. Thus, it is intended that the present invention cover all modifications and variations of this invention consistent with the scope of the appended claims and their equivalents.

This application is based on Japanese Patent Application No. JP2004-183829 filed on Jun. 22 of 2004, the contents of which is incorporated herein by reference.

The invention claimed is:

1. A polarizing plate comprising: a polarizing film; and two transparent protective films, wherein the polarizing film is between the two transparent protective films, and at least one of the two transparent protective films is an optical compensatory sheet comprising a cellulose acylate film, wherein
the polarizing plate has a polarization degree P calculated by formula (1) of more than 99.95%, and
when two of the polarizing plates are arranged in a cross nicol configuration, the two polarizing plates have a transmittance at 700 nm of 0.07% or less and a transmittance at 410 nm of 0.05% or less:

Polarization degree $P=((H0-H1)/(H0+H1))^{1/2}\times 100$ (1)

wherein H0 represents a transmittance of two of the polarizing plates at the time the two polarizing plates are stacked on each other such that absorption axes of the two polarizing plates correspond with each other; and H1 represents a transmittance of two of the polarizing plates at the time the two polarizing plates are stacked on each other such that the absorption axes of the two polarizing plates are perpendicular to each other, and wherein hue x, y in a CIE color space, when two of the polarizing plates are arranged in a cross nicol configuration, satisfy $0.28 \leq x \leq 0.30$ and $0.28 \leq y \leq 0.30$.

2. The polarizing plate according to claim 1, wherein the transmittance at 410 nm of the two polarizing plates arranged in the cross nicol configuration is 0.02% or less.

3. The polarizing plate according to claim 1, wherein the optical compensation sheet has: Re retardation value defined by formula (2) of from 20 to 80 nm; Rth retardation value defined by formula (3) of from 70 to 400 nm; and a ratio of Re retardation value to Rth retardation value of from 0.1 to 0.5:

$$Re = (nx - ny) \times d \qquad (2)$$

$$Rth = \{(nx + ny)/2 - nz\} \times d \qquad (3),$$

wherein nx represents an in-plane refractive index of the optical compensation sheet in a direction of slow axis; ny represents an in-plane refractive index of the optical compensation sheet in a direction of fast axis; nz represents a refractive index of the optical compensation sheet in a thickness direction; and d represents a thickness of the optical compensation sheet.

4. The polarizing plate according to claim 3, wherein the cellulose acylate film comprises a mixed aliphatic acid ester of cellulose, wherein a hydroxyl group of the cellulose is substituted by an acetyl group, and another hydroxyl group of the cellulose is substituted by an acyl group having 3 or more carbon atoms; and the cellulose acylate film satisfies formulae (4) and (5):

$$2.0 \leq A + B \leq 3.0 \qquad (4)$$

$$0 \leq B \qquad (5)$$

wherein A is a degree of substitution by the acetyl group; and B is a degree of substitution by the acyl group having 3 or more carbon atoms.

5. The polarizing plate according to claim 4, wherein the acyl group is a butyryl group.

6. The polarizing plate according to claim 4, wherein the acyl group is a propionyl group, and the degree B is 1.3 or more.

7. The polarizing plate according to claim 4, wherein a sum of the degree of substitution of hydroxyl group in a 6 position of cellulose is 0.75 or more.

8. The polarizing plate according to claim 4, wherein DS2, DS3 and DS6 respectively representing degrees of substitution of hydroxyl groups in 2, 3 and 6 positions of a glucose unit of the cellulose by an acyl group having 2 or more carbon atoms satisfy:

$$2.0 \leq DS2 + DS3 + DS6 \leq 3.0 \qquad (I)$$

$$DS6/(DS2 + DS3 + DS6) \geq 0.315 \qquad (II).$$

9. The polarizing plate according to claim 1, wherein the cellulose acylate film comprises a compound containing at least two aromatic rings in an amount of from 0.01 to 20 parts by weight based on parts by weight of cellulose acylate.

10. The polarizing plate according to claim 9, wherein the compound containing at least two aromatic rings is a rod-shaped compound having a linear molecular structure.

11. The polarizing plate according to claim 1, wherein the cellulose acylate film is a film stretched at a draw ratio of from 3 to 100%.

12. The polarizing plate according to claim 11, wherein the cellulose acylate film comprises a cellulose acylate having: an acetylation degree of from 59.0 to 61.5%; and an amount of Re/Rth change of from 0.01 to 0.1 per 1% of draw ratio.

13. The polarizing plate according to claim 1, wherein the cellulose acylate film is a film stretched in a direction perpendicular to a longitudinal direction with a content of residual solvent in the cellulose acylate film, the content being kept to a range of from 2 to 30% by weight while the film being conveyed in the longitudinal direction; and the optical compensation sheet has a low axis aligned in the direction perpendicular to the longitudinal direction thereof.

14. The polarizing plate according to claim 1, wherein one of the two transparent protective films is the optical compensation sheet comprising the cellulose acylate film; the other of the two transparent protective films has an anti-reflection layer having a specular reflectance of 2.5% or less; and the anti-reflection layer comprises a light scattering layer and a lower refractive index layer.

15. The polarizing plate according to claim 1, wherein one of the two transparent protective films is the optical compensation sheet comprising the cellulose acylate film; the other of the two transparent protective films has an anti-reflection layer having a specular reflectance of 0.5% or less; and the anti-reflection layer comprises a middle refractive layer, a higher refractive layer, and a lower refractive layer in this order.

16. The polarizing plate according to claim 1, wherein the polarizing film comprises a dichroic substance and a hue adjusting agent.

17. The polarizing plate according to claim 16, wherein the hue adjusting agent has a main absorption in at least one range of from 380 nm to 500 nm and from 600 nm to 720 nm.

18. The polarizing plate according to claim 16, wherein the hue adjusting agent is a dichroic dye.

19. A liquid crystal display device comprising:
a liquid crystal cell of VA mode; and
two polarizing plates, wherein the liquid crystal cell is between the two polarizing plates, and at least one of the two polarizing plates is a polarizing plate according to claim 1, wherein
the optical compensation sheet of the polarizing plate is disposed on a liquid crystal cell side of the polarizing film,
and a slow axis of the optical compensation sheet and a transmission axis of the polarizing film adjacent of the optical compensation sheet are aligned substantially parallel to each other.

20. A liquid crystal display device comprising:
a liquid crystal cell of VA mode; and
two polarizing plates, wherein the liquid crystal cell is between the two polarizing plates, and at least one of the two polarizing plates is a polarizing plate according to claim 14, wherein
the anti-reflection layer is disposed on a viewing side of the polarizing film, and
a slow axis of the optical compensation sheet and a transmission axis of the polarizing film adjacent of the optical compensation sheet are aligned substantially parallel to each other.

* * * * *